(12) United States Patent
Wang et al.

(10) Patent No.: US 8,505,822 B2
(45) Date of Patent: Aug. 13, 2013

(54) APPARATUS AND METHOD COMPRISING DEFORMABLE LENS ELEMENT

(75) Inventors: Ynjiun P. Wang, Cupertino, CA (US); Chen Feng, Snohomish, WA (US); William H. Havens, Syracuse, NY (US); Jianhua Li, Fremont, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 12/901,242

(22) Filed: Oct. 8, 2010

(65) Prior Publication Data

US 2011/0017829 A1 Jan. 27, 2011

Related U.S. Application Data

(62) Division of application No. 11/897,924, filed on Aug. 31, 2007, now Pat. No. 7,813,047.

(60) Provisional application No. 60/961,036, filed on Jul. 18, 2007, provisional application No. 60/875,245, filed on Dec. 15, 2006.

(51) Int. Cl.
  *G06K 7/10* (2006.01)
  *G06K 5/00* (2006.01)

(52) U.S. Cl.
  USPC .................................. 235/462.01; 235/380

(58) Field of Classification Search
  USPC ............................. 235/380, 462.01
  See application file for complete search history.

(56) References Cited

U.S. PATENT DOCUMENTS

| | | | |
|---|---|---|---|
| 1,269,422 A | 6/1918 | Gordon |
| 2,062,468 A | 12/1936 | Matz |
| 2,300,251 A | 10/1942 | Flint |
| 3,161,718 A | 12/1964 | DeLuca |
| 3,305,294 A | 2/1967 | Alvarez |
| 3,583,790 A | 6/1971 | Baker |
| 3,761,157 A | 9/1973 | Humphrey |
| 3,778,170 A | 12/1973 | Howell et al. |
| 4,134,393 A | 1/1979 | Stark et al. |
| 4,191,594 A | 3/1980 | Stark et al. |
| 4,210,121 A | 7/1980 | Stark |
| 4,249,516 A | 2/1981 | Stark |
| 4,261,655 A | 4/1981 | Honigsbaum |
| 4,289,379 A | 9/1981 | Michelet |

(Continued)

FOREIGN PATENT DOCUMENTS

| CN | 1677152 A | 10/2005 |
|---|---|---|
| DE | 3424068 A1 | 5/1985 |

(Continued)

OTHER PUBLICATIONS

U.S. Appl. No. 11/546,531, filed Oct. 11, 2006, Title: Data Reader Apparatus Having an Adaptive Lens.

(Continued)

*Primary Examiner* — Daniel Hess
*Assistant Examiner* — David Tardif
(74) *Attorney, Agent, or Firm* — Heslin Rothenberg Farley & Mesiti P.C.

(57) ABSTRACT

An apparatus comprising a deformable lens element can be provided wherein a deformable lens element can be deformed to change an optical property thereof by the impartation of a force to the deformable lens element.

16 Claims, 16 Drawing Sheets

(56) References Cited

U.S. PATENT DOCUMENTS

| | | | |
|---|---|---|---|
| 4,312,709 A | 1/1982 | Stark et al. | |
| 4,407,567 A | 10/1983 | Michelet et al. | |
| 4,487,659 A | 12/1984 | Stark | |
| 4,514,048 A | 4/1985 | Rogers | |
| 4,783,153 A | 11/1988 | Kushibiki et al. | |
| 4,783,155 A | 11/1988 | Imataki et al. | |
| 4,784,479 A | 11/1988 | Ikemori | |
| 4,802,746 A | 2/1989 | Baba et al. | |
| 4,818,847 A | 4/1989 | Hara et al. | |
| 5,091,801 A | 2/1992 | Ebstein | |
| 5,113,445 A | 5/1992 | Wang | |
| 5,150,234 A | 9/1992 | Takahashi et al. | |
| 5,199,084 A | 3/1993 | Kishi et al. | |
| 5,243,655 A | 9/1993 | Wang | |
| 5,278,399 A | 1/1994 | Sano | |
| 5,291,243 A | 3/1994 | Heckman et al. | |
| 5,305,356 A | 4/1994 | Brooks et al. | |
| 5,307,423 A | 4/1994 | Gupta et al. | |
| 5,317,388 A | 5/1994 | Surka et al. | |
| 5,331,176 A | 7/1994 | Sant' Anselmo et al. | |
| 5,337,361 A | 8/1994 | Wang et al. | |
| 5,389,222 A | 2/1995 | Shahinpoor | |
| 5,393,965 A | 2/1995 | Bravman et al. | |
| 5,396,144 A | 3/1995 | Gupta et al. | |
| 5,401,944 A | 3/1995 | Bravman et al. | |
| 5,428,212 A | 6/1995 | Tani et al. | |
| 5,471,533 A | 11/1995 | Wang et al. | |
| 5,489,158 A | 2/1996 | Wang et al. | |
| 5,513,264 A | 4/1996 | Wang et al. | |
| 5,579,487 A | 11/1996 | Meyerson et al. | |
| 5,646,389 A | 7/1997 | Bravman et al. | |
| 5,659,167 A | 8/1997 | Wang et al. | |
| 5,684,637 A | 11/1997 | Floyd | |
| 5,710,419 A | 1/1998 | Wang et al. | |
| 5,734,153 A | 3/1998 | Swartz et al. | |
| 5,742,263 A | 4/1998 | Wang et al. | |
| 5,793,033 A | 8/1998 | Feng et al. | |
| 5,818,023 A | 10/1998 | Meyerson et al. | |
| 5,834,754 A | 11/1998 | Feng et al. | |
| 5,841,121 A | 11/1998 | Koenck | |
| 5,866,888 A | 2/1999 | Bravman et al. | |
| 5,877,487 A | 3/1999 | Tani et al. | |
| 5,880,453 A | 3/1999 | Wang et al. | |
| 5,892,625 A | 4/1999 | Heimer | |
| 5,917,171 A | 6/1999 | Sasai | |
| 5,917,657 A * | 6/1999 | Kaneko et al. | 359/661 |
| 5,917,913 A | 6/1999 | Wang | |
| 5,973,852 A | 10/1999 | Task | |
| 6,081,388 A | 6/2000 | Widl | |
| 6,109,852 A | 8/2000 | Shahinpoor et al. | |
| 6,123,261 A | 9/2000 | Roustaei | |
| 6,123,263 A | 9/2000 | Feng | |
| 6,175,922 B1 | 1/2001 | Wang | |
| 6,188,526 B1 | 2/2001 | Sasaya et al. | |
| 6,212,015 B1 | 4/2001 | Heimer | |
| 6,282,656 B1 | 8/2001 | Wang | |
| 6,368,954 B1 | 4/2002 | Lopatin et al. | |
| 6,369,954 B1 | 4/2002 | Berge et al. | |
| 6,376,971 B1 | 4/2002 | Pelrine et al. | |
| 6,399,954 B1 | 6/2002 | Seto et al. | |
| 6,437,925 B1 | 8/2002 | Nishioka | |
| 6,449,081 B1 | 9/2002 | Onuki et al. | |
| 6,475,639 B2 | 11/2002 | Shahinpoor et al. | |
| 6,512,218 B1 | 1/2003 | Canini et al. | |
| 6,529,620 B2 | 3/2003 | Thompson | |
| 6,538,823 B2 | 3/2003 | Kroupenkine et al. | |
| 6,542,309 B2 | 4/2003 | Guy | |
| 6,545,815 B2 | 4/2003 | Kroupenkine et al. | |
| 6,545,816 B1 | 4/2003 | Kroupenkine et al. | |
| 6,586,859 B2 | 7/2003 | Kornbluh et al. | |
| 6,594,759 B1 | 7/2003 | Wang | |
| 6,628,040 B2 | 9/2003 | Pelrine et al. | |
| 6,669,093 B1 | 12/2003 | Meyerson et al. | |
| 6,702,483 B2 | 3/2004 | Tsuboi et al. | |
| 6,715,876 B2 | 4/2004 | Floyd | |
| 6,723,929 B2 | 4/2004 | Kent | |
| 6,743,903 B1 | 6/2004 | Gordon et al. | |
| 6,747,806 B2 | 6/2004 | Gelbart | |
| 6,762,210 B1 | 7/2004 | Oguro et al. | |
| 6,806,621 B2 | 10/2004 | Heim et al. | |
| 6,806,988 B2 | 10/2004 | Onuki et al. | |
| 6,808,114 B1 | 10/2004 | Palestini et al. | |
| 6,809,462 B2 | 10/2004 | Pelrine et al. | |
| 6,812,624 B1 | 11/2004 | Pei et al. | |
| 6,832,725 B2 | 12/2004 | Gardiner et al. | |
| 6,850,916 B1 | 2/2005 | Wang | |
| 6,882,086 B2 | 4/2005 | Kornbluh et al. | |
| 6,889,904 B2 | 5/2005 | Bianculli et al. | |
| 6,891,317 B2 | 5/2005 | Pei et al. | |
| 6,934,090 B2 | 8/2005 | Nagaoka et al. | |
| 6,936,809 B2 | 8/2005 | Viinikanoja | |
| 7,065,344 B2 | 6/2006 | O'Hagan et al. | |
| 7,089,214 B2 | 8/2006 | Wang | |
| 7,107,246 B2 | 9/2006 | Wang | |
| 7,169,822 B2 | 1/2007 | Oguro et al. | |
| 7,193,794 B2 * | 3/2007 | Beck et al. | 359/822 |
| 7,224,106 B2 | 5/2007 | Pei et al. | |
| 7,270,274 B2 | 9/2007 | Hennick et al. | |
| RE39,874 E | 10/2007 | Berge et al. | |
| 7,293,712 B2 | 11/2007 | Wang | |
| 7,364,081 B2 | 4/2008 | Havens et al. | |
| 7,416,125 B2 | 8/2008 | Wang et al. | |
| 7,440,193 B2 | 10/2008 | Gunasekaran et al. | |
| 7,533,824 B2 | 5/2009 | Hennick et al. | |
| 7,568,628 B2 | 8/2009 | Wang et al. | |
| 7,611,060 B2 | 11/2009 | Wang et al. | |
| 7,635,084 B2 | 12/2009 | Wang et al. | |
| 7,717,343 B2 | 5/2010 | Havens et al. | |
| 7,813,047 B2 | 10/2010 | Wang et al. | |
| 7,878,403 B2 | 2/2011 | Hennick et al. | |
| 7,909,257 B2 | 3/2011 | Wang et al. | |
| 7,918,398 B2 | 4/2011 | Li et al. | |
| 7,922,088 B2 | 4/2011 | Wang | |
| 7,946,493 B2 | 5/2011 | Havens et al. | |
| 8,016,189 B2 | 9/2011 | Wang et al. | |
| 8,027,095 B2 | 9/2011 | Havens | |
| 8,027,096 B2 | 9/2011 | Feng et al. | |
| 8,038,066 B2 | 10/2011 | Havens et al. | |
| 8,083,148 B2 | 12/2011 | Wang et al. | |
| 8,146,820 B2 | 4/2012 | Wang et al. | |
| 2002/0023215 A1 | 2/2002 | Wang et al. | |
| 2002/0052185 A1 | 5/2002 | O'Hagan et al. | |
| 2002/0066851 A1 | 6/2002 | Hennick et al. | |
| 2002/0123967 A1 | 9/2002 | Wang | |
| 2003/0004827 A1 | 1/2003 | Wang | |
| 2004/0008853 A1 | 1/2004 | Pelrine et al. | |
| 2004/0195328 A1 | 10/2004 | Barber et al. | |
| 2004/0218283 A1 | 11/2004 | Nagaoka et al. | |
| 2004/0227063 A1 | 11/2004 | Viinikanoja | |
| 2004/0228003 A1 | 11/2004 | Takeyama et al. | |
| 2005/0002113 A1 | 1/2005 | Berge | |
| 2005/0014306 A1 | 1/2005 | Yao et al. | |
| 2005/0100270 A1 | 5/2005 | O'Connor et al. | |
| 2005/0145698 A1 | 7/2005 | Havens et al. | |
| 2005/0218231 A1 | 10/2005 | Massieu | |
| 2006/0071081 A1 | 4/2006 | Wang | |
| 2006/0072915 A1 | 4/2006 | Onozawa | |
| 2006/0076540 A1 | 4/2006 | Zama et al. | |
| 2006/0086596 A1 | 4/2006 | Lee et al. | |
| 2006/0202036 A1 | 9/2006 | Wang et al. | |
| 2006/0202038 A1 | 9/2006 | Wang et al. | |
| 2007/0063048 A1 * | 3/2007 | Havens et al. | 235/462.46 |
| 2007/0080280 A1 | 4/2007 | Havens | |
| 2007/0089168 A1 | 4/2007 | Wang et al. | |
| 2007/0116858 A1 | 5/2007 | Benslimane et al. | |
| 2007/0156021 A1 | 7/2007 | Morse et al. | |
| 2007/0158428 A1 | 7/2007 | Havens et al. | |
| 2008/0144185 A1 | 6/2008 | Wang et al. | |
| 2008/0144186 A1 | 6/2008 | Feng et al. | |
| 2008/0225379 A1 | 9/2008 | Mescher | |
| 2008/0245872 A1 | 10/2008 | Good | |
| 2009/0072037 A1 | 3/2009 | Good et al. | |
| 2009/0072038 A1 | 3/2009 | Li et al. | |
| 2009/0086331 A1 | 4/2009 | Gunasekaran et al. | |

| | | | |
|---|---|---|---|
| 2009/0088203 | A1 | 4/2009 | Havens et al. |
| 2009/0108072 | A1 | 4/2009 | Wang |
| 2009/0188978 | A1 | 7/2009 | Perreault |
| 2010/0044440 | A1 | 2/2010 | Wang et al. |
| 2010/0090007 | A1 | 4/2010 | Wang et al. |
| 2010/0147956 | A1 | 6/2010 | Wang et al. |
| 2010/0276490 | A1 | 11/2010 | Havens et al. |
| 2010/0276491 | A1 | 11/2010 | Havens et al. |
| 2010/0276492 | A1 | 11/2010 | Wang et al. |
| 2010/0276493 | A1 | 11/2010 | Havens et al. |
| 2011/0004557 | A1 | 1/2011 | Wang et al. |
| 2011/0006117 | A1 | 1/2011 | Wang |
| 2011/0017829 | A1 | 1/2011 | Wang et al. |
| 2011/0036908 | A1 | 2/2011 | Havens et al. |
| 2011/0036911 | A1 | 2/2011 | Havens et al. |
| 2011/0089245 | A1 | 4/2011 | Havens et al. |
| 2011/0163165 | A1 | 7/2011 | Liu et al. |
| 2011/0163166 | A1 | 7/2011 | Wang et al. |
| 2011/0174880 | A1 | 7/2011 | Li et al. |
| 2011/0188752 | A1 | 8/2011 | Wang |
| 2011/0212751 | A1 | 9/2011 | Havens et al. |
| 2011/0290887 | A1 | 12/2011 | Wang et al. |
| 2011/0309145 | A1 | 12/2011 | Richardson et al. |

FOREIGN PATENT DOCUMENTS

| | | |
|---|---|---|
| DE | 3644225 A1 | 7/1987 |
| DE | 19706274 A1 | 8/1997 |
| DE | 102005013889 A1 | 10/2005 |
| EP | 1674892 A1 | 6/2006 |
| EP | 2007862981 A2 | 8/2009 |
| GB | 1327503 A | 8/1973 |
| JP | 60114802 A | 6/1985 |
| JP | 62148903 A | 7/1987 |
| JP | 1140118 A | 6/1989 |
| JP | 02012518 A | 1/1990 |
| JP | 3206420 A | 9/1991 |
| JP | 9230252 A | 9/1997 |
| JP | 2002243918 A | 8/2002 |
| JP | 2005283750 A | 10/2005 |
| JP | 2006058405 A | 3/2006 |
| JP | 2010157222 A | 7/2010 |
| JP | 2010170561 A | 8/2010 |
| WO | WO-9638744 A1 | 12/1996 |
| WO | WO-9918456 A1 | 4/1999 |
| WO | WO-9918546 A1 | 4/1999 |
| WO | WO-0058763 A1 | 10/2000 |
| WO | WO-0122148 A1 | 3/2001 |
| WO | WO-03044588 A1 | 5/2003 |
| WO | WO-03069380 A1 | 8/2003 |
| WO | WO-03071335 A2 | 8/2003 |
| WO | WO-2004027489 A1 | 4/2004 |
| WO | WO-2004038480 A1 | 5/2004 |
| WO | WO-2004050334 A1 | 6/2004 |
| WO | WO-2004051323 A1 | 6/2004 |
| WO | WO-2004072689 A2 | 8/2004 |
| WO | WO-2004077126 A1 | 9/2004 |
| WO | WO-2004097495 A1 | 11/2004 |
| WO | WO-2004099829 A2 | 11/2004 |
| WO | WO-2004099830 A1 | 11/2004 |
| WO | WO-2004099844 A1 | 11/2004 |
| WO | WO-2004099845 A1 | 11/2004 |
| WO | WO-2004102250 A1 | 11/2004 |
| WO | WO-2004102252 A1 | 11/2004 |
| WO | WO-2004102253 A1 | 11/2004 |
| WO | WO-2005003842 A1 | 1/2005 |
| WO | WO-2005003843 A1 | 1/2005 |
| WO | WO-2005006029 A1 | 1/2005 |
| WO | WO-2005006312 A2 | 1/2005 |
| WO | WO-2005069042 A1 | 7/2005 |
| WO | WO-2005069043 A1 | 7/2005 |
| WO | WO-2005069044 A1 | 7/2005 |
| WO | WO-2005071359 A1 | 8/2005 |
| WO | WO-2005073762 A1 | 8/2005 |
| WO | 2006121659 A1 | 11/2006 |
| WO | WO-2008076399 A2 | 6/2008 |

OTHER PUBLICATIONS

AMS-1000 Tunable lens unit, Varioptic, France, 1 page (http://www.varioptic.com/en/products.php?cat=PAMS—Sep. 14, 2005).

Arora, S., Ghosh, T., and Muth, J., "Dielectric elastomer based prototype fiber actuators", Sensors and Actuators A: Physical, 136:1, pp. 321-328 (May 2007).

Bal, Abdullah et al, Improved fingerprint identification with supervised filtering enhancement, Applied Optics, Feb. 10, 2005, pp. 647-654, vol. 44, No. 5, Optical Society of America.

Berge, B. et al, Variable focal lens controlled by an external voltage: An application of electrowetting, The European Physical Journal E, Dec. 1, 1999, pp. 159-163.

Chronis N, Liu GL, Jeong K-H, and Lee LP, 2003, "Tunable liquid-filled microlens array integrated with microfluidic network", Optics Express 11(19):2370-2378.

Conductive Elastomer Sheet Stock, Chomerics, 3 pages (www.chomerics.com).

Ghosh TK, Kotek R, and Muth J, 2005, "Development of layered functional fiber based micro-tubes", National Textile Center Annual Report 1-9.

ICM105T VGA CMOS image sensor (Data Sheet), IC Media, May 2004, 17 pages.

International Search Report for International Patent Application No. PCT/US2007/025707 dated Aug. 19, 2008. 7 pages.

Introducing a CMOS Image Sensor Specifically Designed for Automotive Scene—Understanding Systems, Micron, 2 pages (www.micron.com—Oct. 2, 2004).

Invitation to Pay Additonal fees and Communication Relating to the Results of the partial International Search, International Application No. PCT/US2007/025707, 4 pages, dated Jun. 4, 2008.

Kuiper, S. et al, Variable-focus lens for miniature cameras, Applied Physics Letters, Aug. 16, 2004, pp. 1128-1130, vol. 85, No. 7, American Institute of Physics.

Levy, Eli et al, Modulation transfer function of a lens measured with a random target method, Applied Optics, Feb. 1, 1999, pp. 679-683, vol. 38, No. 4, Optical Society of America.

Liquid Lens Mimics the Human Eye (Press Release), Agency for Science, Technology and Research, 5 pages.

Mugele, Frieder et al, Electrowetting: from basics to applications, Journal of Physics: Condensed Matter, J. Phys. Condens, Matter 17 (2005), pp. R705-R774, JOP Publishing Ltd., UK.

Narayanswamy, Ramkumar et al, Extending the imaging volume for biometric iris recognition, Applied Optics, Feb. 10, 2005, pp. 701-712, vol. 44, No. 5, Optical Society of America.

Office action from U.S. Appl. No. 11/781,901, dated Mar. 2, 2009 (7 pages).

Patent Cooperation Treaty, International Preliminary Report on Patentability, PCT/US2007/025707, dated Jun. 16, 2009 (1 pg.).

Patent Cooperation Treaty, International Searching Authority, Written Opinion of the International Searching Authority, PCT/US2007/025707, dated Jun. 16, 2009 (9 pgs.).

PCT Application No. 2007/800514041 filed Dec. 14, 2007. Title: Apparatus and Method Comprising Deformable Lens Element.

PCT Application No. 2009/541411 filed Jun. 15, 2009. Title: Apparatus and Method Comprising Deformable Lens Element.

Pelrine R, Kornbluh RD, Pei Q, Stanford S, Oh S, Eckerle, J, Full RJ, Rosenthal MA, and Meijer K, 2002, "Dielectric elastomer artificial muscle actuators: toward biomimetic motion", Proc. SPIE 4695:126-137.

Philips' Fluid Lenses Bring Things into Focus, Philips' Fluid Lenses: Digital Photography Review, 3 pages (http://www.dpreview.com/news/article_printasp?date=0403&article=04030302philipsfluid...—Sep. 14, 2005).

Ren H., Fox D., Anderson A., Wu B., and Wu S-T, 2006, "Tunable-focus liquid lens controlled using a servo motor", Optics Express 14(18):8031-8036.

Santiago-Alvarado A., González-Garcia J, Garcia-Luna J, Fernández-Moreno A, and Vera-Diaz W, 2006, "Analysis and design of an adaptive lens", Proceedings of SPIE Optics and Photonics 6288:62880S-1-62880S-8.

Smith, Warren J., Modern Optical Engineering the Design of Optical Sytems, McGraw-Hill Book Company, p. 58-59, 4 pages.

U. S. Patent and Trademark Office, Apr. 14, 2010 Office Action in U.S. Appl. No. 11/781,901, 12 pgs.

U. S. Patent and Trademark Office, Mar. 2, 2009 Office Action in U.S. Appl. No. 11/781,901, 6 pgs.

U.S. Appl. No. 12/901,242, filed Oct. 8, 2010, entitled Apparatus and Method Comprising Deformable Lens Element, 72 pgs.

U.S. Appl. No. 12/540,075, filed Aug. 12, 2009, Title: Laser Scanning Indicia Reading Terminal Having Variable Lens Assembly.

U.S. Appl. No. 12/432,434, filed Apr. 29, 2009, Title: Fluid Lens Element for Use in Changing Thermal Operating Environment.

U.S. Appl. No. 12/432,517, filed Apr. 29, 2009, Title: Laser Scanner With Deformable Lens.

U.S. Appl. No. 12/432,534, filed Apr. 29, 2009, Title: Long Range Laser Scanner With Fluid Lens and MLD Decoder.

Written Opinion of the International Searching Authority for International Patent Application No. PCT/US2007/025707 dated Aug. 19, 2008. 10 pages.

May 23, 2012 Notification of Publication and Entry into Substantive Examination Phase in Chinese Patent Application No. 201110437420.2, with translation.

May 25, 2012 Communication pursuant to Article 94(3) EPC in European Application No. 07862981.3.

Oct. 25, 2012 Office Action in U.S. Appl. No. 13/245,456.

Mar. 19, 2013 Office Action in U.S. Appl. No. 13/245,456.

Mar. 14, 2013 Office Action in U.S. Appl. No. 12/582,216.

\* cited by examiner

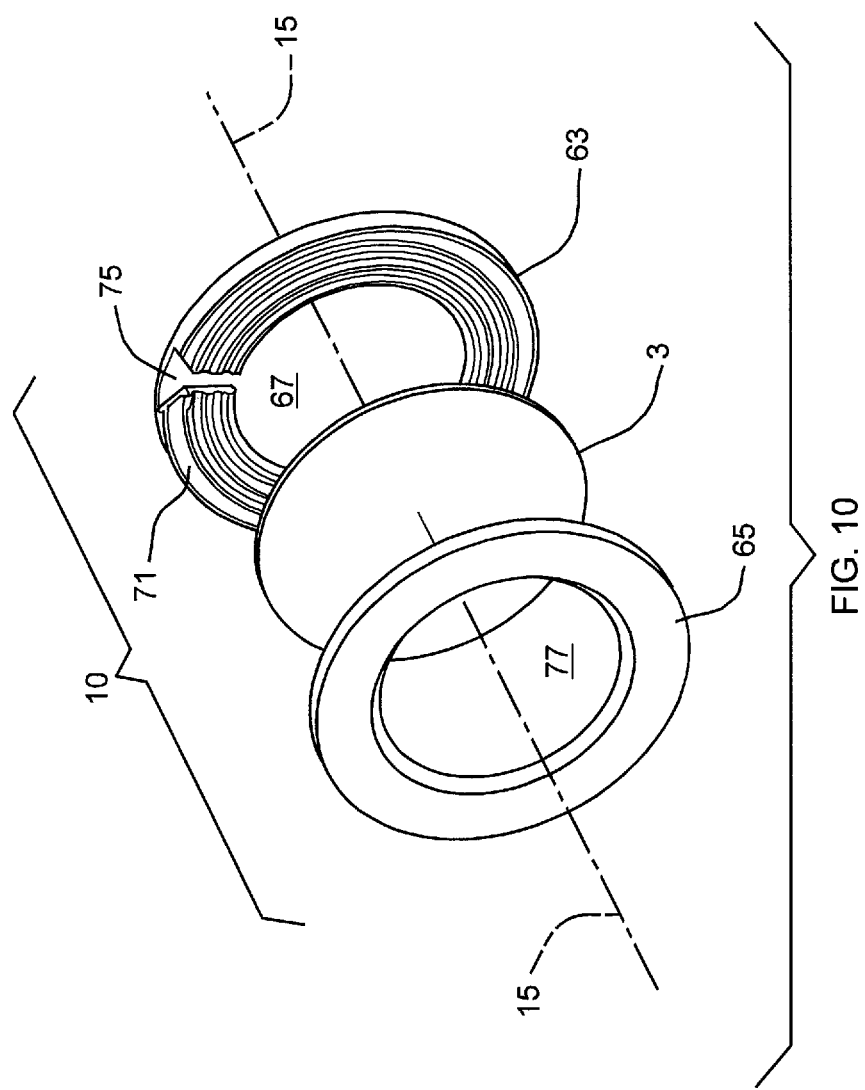

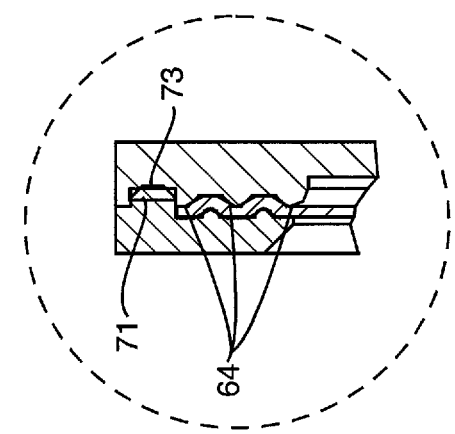
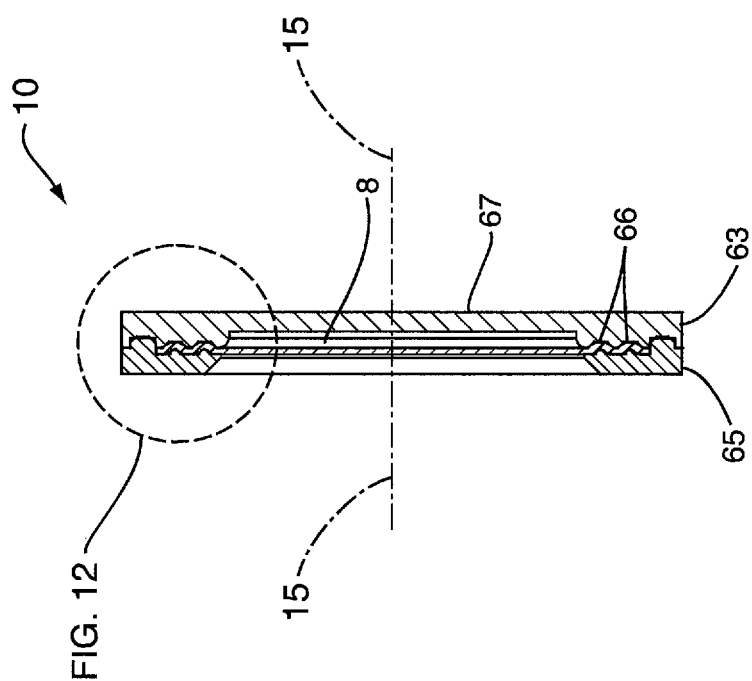

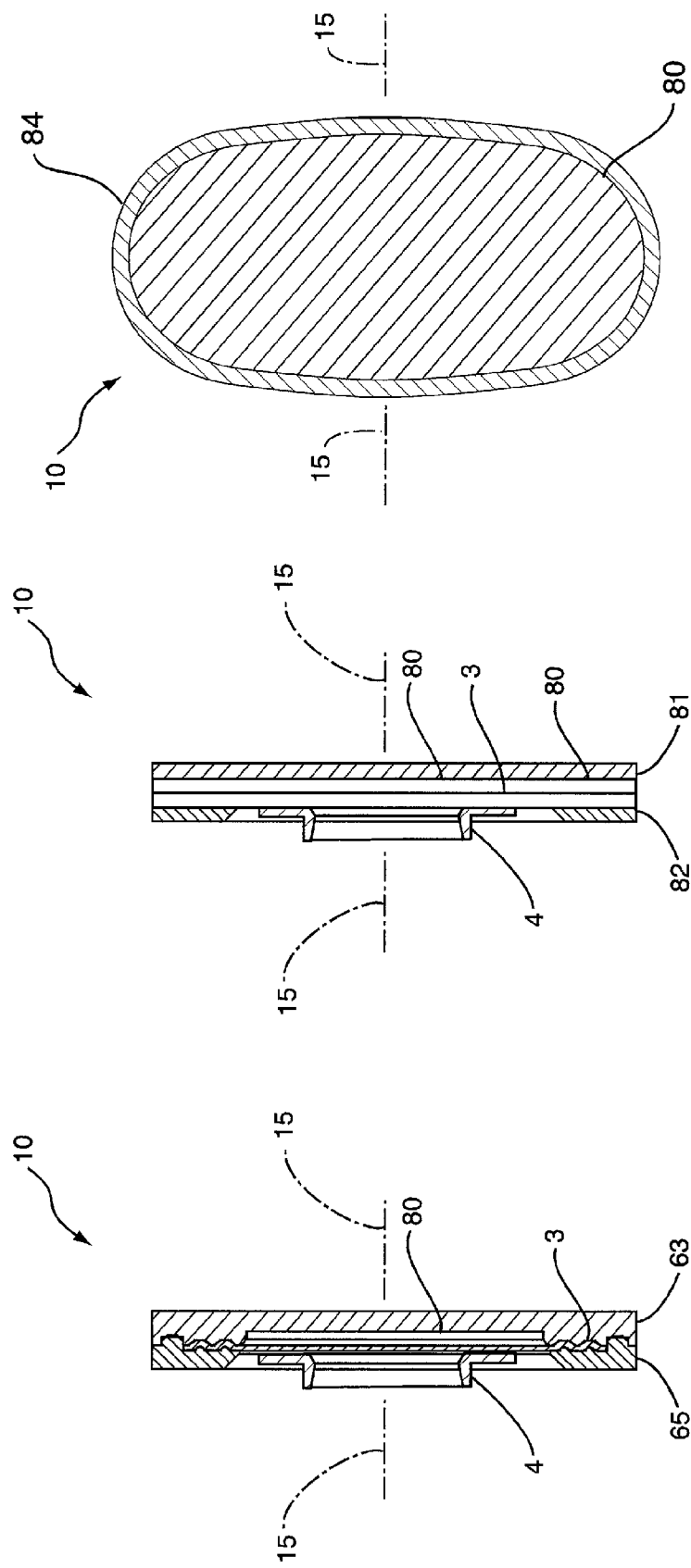

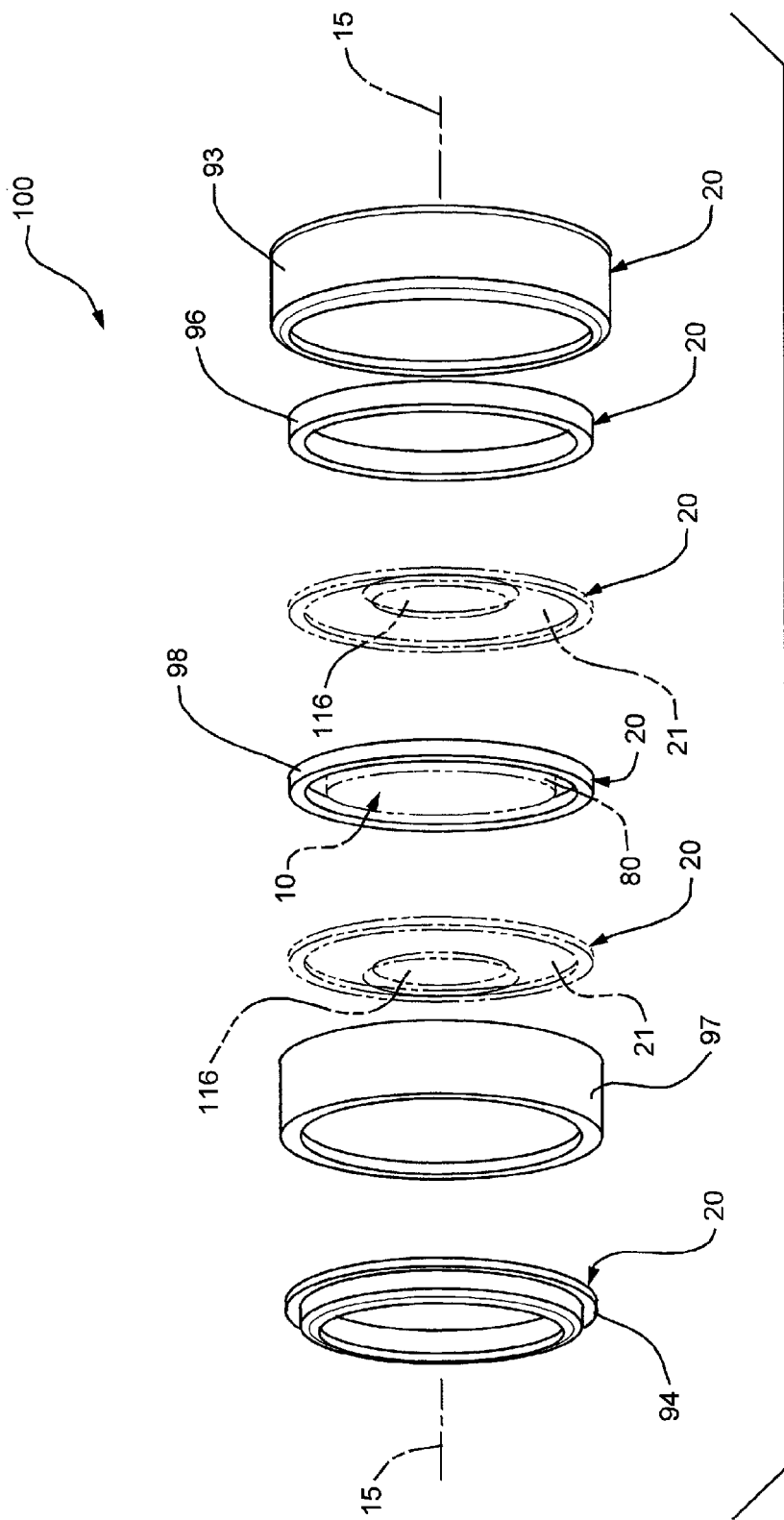

APPARATUS AND METHOD COMPRISING DEFORMABLE LENS ELEMENT

CROSS REFERENCE TO RELATED APPLICATIONS

This application is a divisional of U.S. patent application Ser. No. 11/897,924 filed Aug. 31, 2007, entitled "Apparatus And Method Comprising Deformable Lens Element," which claims priority under 35 U.S.C. §119(e) to Provisional Patent Application No. 60/961,036 entitled "Variable Lens Elements And Modules," filed Jul. 18, 2007 and to U.S. Provisional Patent Application No. 60/875,245, entitled "Focus Module and Components With Actuator Polymer Control," filed Dec. 15, 2006. Each of the above applications is incorporated herein by reference in its entirety.

FIELD OF THE INVENTION

The invention relates to a lens element for incorporation into an optical imaging system and specifically to an apparatus and method comprising a deformable lens element.

BACKGROUND OF THE INVENTION

Variable lenses, e.g., multiple focus lenses and zoom lenses have traditionally employed one or more non-deformable (i.e., rigid such as glass or polycarbonate) lens elements which are moved along an imaging axis by forces often supplied by a motor.

In recent years, motorless electro-responsive lens elements have attracted increased attention of researchers and designers of optical systems. One type of motorless electro-responsive lens element is the "fluid lens" lens element which generally includes a rigid or elastomeric membrane filled with one or more fluids having indices of refraction greater than 1. Fluid lens element technology has attracted the attention of many designers of optical systems who generally see traditional solid lens elements and motor equipped systems as bulky and energy hungry. With the proposals for fluid lens elements there have been proposed various methods for varying an optical property of a fluid lens element for integration into an optical system. Where fluid lens elements have been proposed, the proposed alternatives for varying optical properties of such lens elements can be categorized into two broad categories: electro wetting and fluid injection.

According to a process of electro wetting, a fluid lens element is provided having at least two immiscible fluids and a voltage is applied to the fluid lens element. A surface tension of the fluid lens element changes as a result of the voltage being applied, bringing about a change in the curvature of an interface between the at least two fluids.

According to a process of fluid injection, a pump is provided adjacent a fluid lens element which pumps in and draws out fluid from the lens element. As fluid is pumped in and drawn out of the lens element, optical properties of the lens element change.

Problems have been noted with both the electro wetting and fluid injection methods for varying an optical property of a fluid lens element. Regarding electro wetting, one problem that has been noted is that the electrical current repeatedly flowing through the lens element tends to alter the characteristics of the lens element over time, rendering any system in which the lens element is employed unreliable and unpredictable. Another problem noted with proposals involving electro wetting is that electro wetting normally involves providing two types of fluids. As the reference index difference between the fluids is small, the power of the lens element is reduced.

Regarding the fluid injection methods, the pumps for providing such fluid injection are necessarily complex and intricate making a reasonably costly system and acceptable miniaturization difficult to achieve.

Because of the problems noted with both the electro wetting and fluid injection methods for varying an optical property of a deformable lens element, designers of commercially deployed optical systems continue to rely almost exclusively on traditional motor-actuated rigid lens elements in the design of optical systems. Yet, the miniaturization and energy conservation achievable with motor-actuated rigid element equipped optical systems continues to be limited.

SUMMARY OF THE INVENTION

An apparatus comprising a deformable lens element can be provided wherein a deformable lens element can be deformed to change an optical property thereof by the impartation of a force to the deformable lens element.

DETAILED DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 10 is an exploded perspective assembly view of a deformable lens element in one embodiment.

FIG. 11 is an assembled cutaway side view illustrating the deformable lens element shown in FIG. 10.

FIG. 12 is a detailed cutaway side view illustrating a highlighted section of the deformable lens element as shown in FIG. 10.

FIG. 15 is an assembled side view of a deformable lens element incorporating a resiliently deformable material member.

FIG. 16 is an assembled side view of another embodiment of a deformable lens element incorporating a resiliently deformable material member.

FIG. 17 is a side view of a deformable lens element including a resiliently deformable material member and a protective coating thereon.

FIG. 19 is an exploded perspective assembly view of a focus apparatus as shown in FIG. 18.

FIG. 28 is a front perspective view of a hand held mobile terminal having a hand held housing in which the components as shown in FIG. 25 can be incorporated and supported by.

DETAILED DESCRIPTION OF THE INVENTION

There is described herein in one embodiment a deformable lens element for incorporation into an optical imaging system, wherein a force can be imparted to a surface of the deformable lens element for varying of an optical property of the lens element. There is accordingly, also described herein a method for varying an optical property of an optical imaging system including the steps of incorporating a deformable lens element into an optical imaging system; and imparting a force to a surface of the lens element for varying an optical property of the lens element. With the described apparatus and method, infinitesimal changes in a deformable lens element's shape can result in large variation of a deformable lens element's optical properties.

The described deformable lens element apparatus and method provide a number of advantages. For example, relative to presently available optical systems incorporating exclusively non-deformable (rigid) lens elements, the presently described apparatus and method provides significant changes in optical properties while significantly reducing the amount of movement of a lens element required to produce the desired change in optical property (e.g., focal length). By significantly reducing the amount of movement of a lens element for producing a desired change in optical property, the described apparatus and method facilitate increased miniaturization of an imaging system, and decreased energy consumption of a designed optical system. The above advantages are provided in a highly reliable, easily manufactured optical system that does not exhibit the reliability and manufacturing complexity disadvantages associated with previously proposed electro wetting and fluid injection fluid lens based optical systems.

Figure 1:
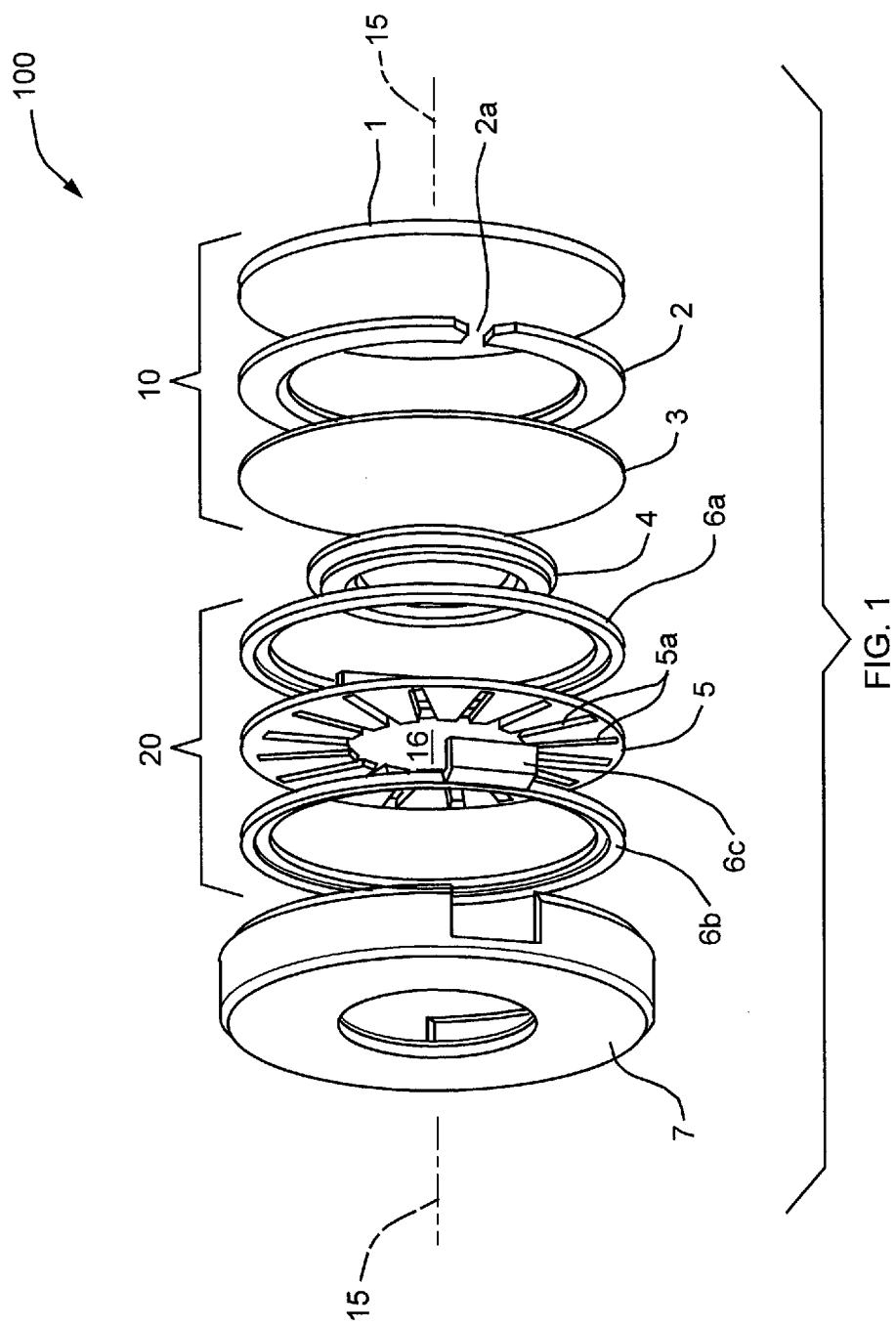
FIG. 1 is an exploded assembly view of a focus apparatus (focusing module) including a deformable lens element that is arranged in such manner that the deformable lens element can be deformed to vary an optical characteristic of the lens element.
Figures 2, 3:
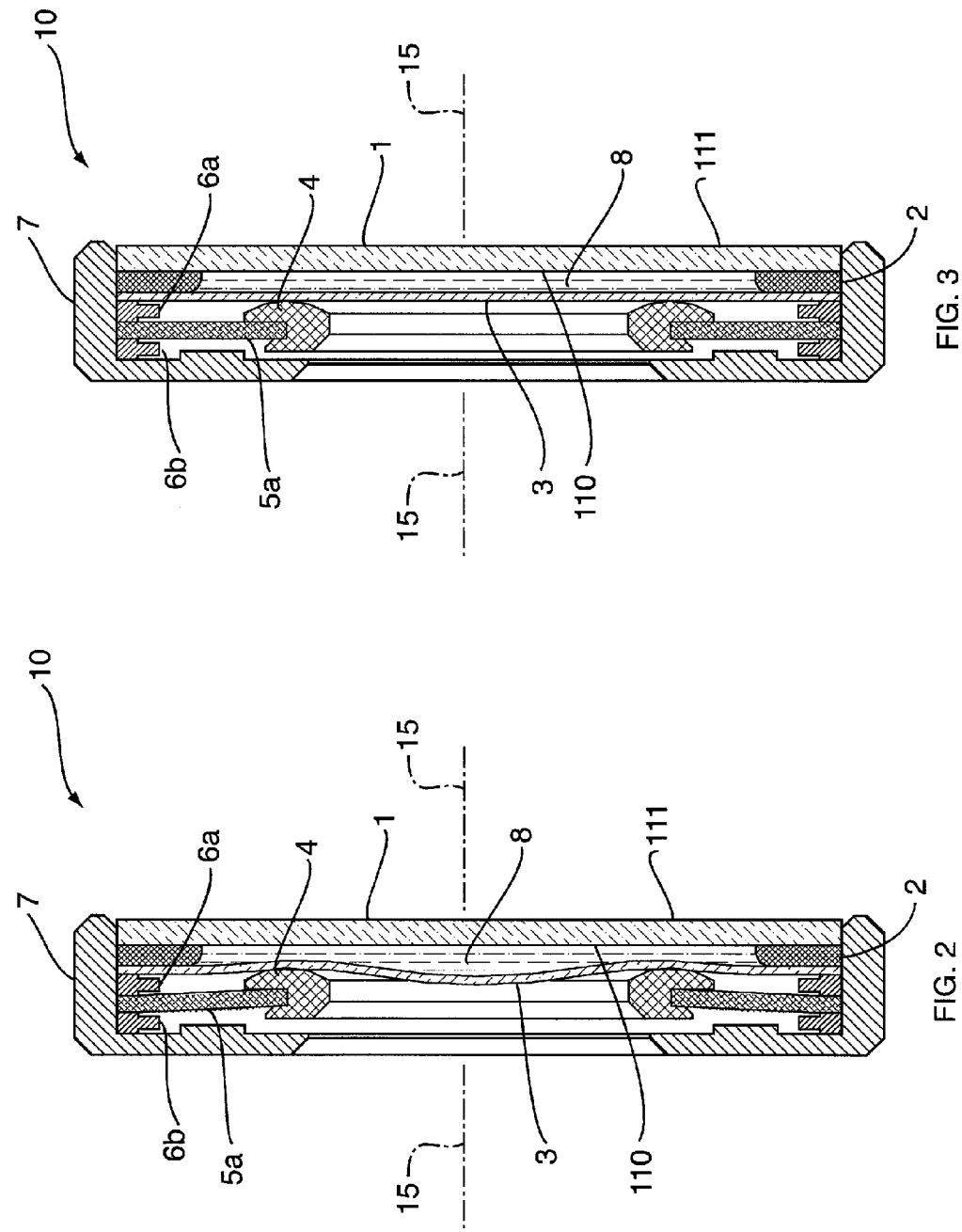
FIG. 2 is an assembled view of the focus apparatus of FIG. 1, showing the apparatus in a state in which the deformable lens element includes a convex lens surface.
FIG. 3 is an assembled view of the focus apparatus of FIG. 1 showing the apparatus in a state in which the deformable lens element includes a nominally planar surface.

Various apparatuses are described herein having a deformable lens element that can be deformed by application of a force to an external surface thereof. An illustrative embodiment of a described apparatus and method is shown in FIG. 1. In the embodiment of FIG. 1, a deformable lens element 10 is provided by the combination of deformable membrane 3, spacer element 2, and boundary element 1 which can be provided by a piece of non-deformable glass, and a focus fluid (not shown) or other deformable substance (e.g., a resiliently deformable volume) having an index of refraction greater than 1. The focus fluid or other deformable substance can be disposed within cavity 8 (as seen in FIGS. 2 and 3) defined by the combination of deformable membrane 3, spacer element 2, and transparent boundary element 1 as seen in FIGS. 2 and 3. Regarding the remaining elements of FIG. 1, the remaining elements are provided to apply a force to an external surface of lens element 10. Referring to the specific embodiment of FIG. 1, there is provided a pressure element 4 (a specific embodiment of which is referred to herein as a "push ring") for contacting deformable membrane 3, and an actuator element (actuator) 20 for actuating pressure element 4. Actuator 20 in the embodiment of FIG. 1 is provided by an ion conductive electro-active polymer (EAP). Actuator 20 in the embodiment of FIG. 1 includes a first conductor element 6a, a second conductor element 6b, and a deformable element 5 comprising a plurality of tab-like elements 5a interposed between the first conductor element 6a and second conductor element 6b. First conductor element 6a includes an electrical contact (hidden from view in FIG. 1) and second conductor element 6b also includes an electrical contact 6c. The apparatus of FIG. 1, which may be termed a "focus module" or "focus apparatus" for use in focusing an image onto an image plane, can further include a housing 7 for housing the elements 10, 4, and 20. Referring again to deformable element 5 of actuator 20, deformable element 5 can comprise one or more layers of conductive polymer material such that tab-like elements 5a bend generally in the direction of axis 15 toward deformable lens element 10 responsively to an electrical signal being applied to conductor elements 6a and 6b. Assembled form side views of apparatus 100 described in FIG. 1 are shown in FIGS. 2 and 3.

For varying the optical characteristics of deformable lens element 10, voltage can be applied to the electrical contacts of first conductor element 6a and second conductor element 6b to cause bending of tab-like elements 5a. As indicated by the assembled form side views of FIGS. 2 and 3, tab-like elements 5a can be arranged to engage pressure element 4 so that when tab-like elements 5a bend toward deformable membrane 3, pressure element 4 applies a force to an external surface of deformable membrane 3. As is indicated by the views of FIGS. 1-3, deformable lens element 10 can include a generally circle shaped surface provided in the embodiment shown by deformable membrane 3 and can include an axis 15 intersecting centers of opposing lens surfaces (provided in the embodiment shown by the exterior surfaces of membrane 3 and boundary element 1). Further, pressure element 4 can be ring-shaped so that pressure element 4 can apply a force generally in a direction coextensive with axis 15 at a plurality of points spaced apart from and peripherally disposed about axis 15 of lens element 10. Apparatus 100 can be adapted so that when tab-like elements 5a curve toward deformable membrane 3, membrane 3 bulges in a direction opposite the applied force to define a convex lens surface, as shown in FIG. 2.

In the embodiment of FIGS. 2 and 3, apparatus 100 has two states; namely, a "power off" state in which tab-like elements 5a bias pressure element 4 toward membrane 3 to cause membrane 3 to bulge to define a convex lens surface and a "power on" state depicted in FIG. 3 in which tab-like elements 5a pull pressure element 4 away from deformable membrane 3 so that deformable membrane 3 is allowed to assume a generally flat and non-convex configuration as best seen in FIG. 3. For providing the control depicted in FIGS. 2 and 3, electro-active polymer actuator 20 can be provided so that tab-like elements 5a are normally biased toward deformable membrane 3 in the absence of voltage being applied to the contacts of actuator 20 and are biased in a direction generally parallel with the plane of membrane 3 (generally perpendicular to axis 15) when in a flat configuration as best seen in FIG. 3 when a certain voltage is applied to the electrical contacts of electro-active polymer actuator 20. In the embodiment depicted in FIGS. 2 and 3, removal of voltage from conductor elements 6a and 6b causes tab-like elements 5a to urge pressure element 4 toward membrane 3, causing membrane 3 to bulge thereby changing an optical characteristic of deformable lens element 10.

Further regarding the embodiment of FIGS. 1-3, it is shown that deformable lens element 10 includes an axis 15 extending transversely therethrough and that actuator 20 applies a force to a surface of deformable lens element 10 in a direction generally coextensive with axis 15. In a further aspect, it is shown that pressure element 4 in the embodiment of FIGS. 1-3 will contact deformable lens element 10 at a plurality of contact positions that are spaced apart from and peripherally disposed about axis 15. Referring to the embodiment of FIGS. 4 and 5, in the embodiment of FIGS. 4 and 5 clear boundary element 1 with first and second planar surfaces 110 and 111 as shown in FIGS. 2-3 is replaced with a boundary element 1 having an optical power. Boundary element 1 of the embodiment of FIG. 4 has an un-curved (planar) first surface 112 and a convex second surface 113. Boundary element 1 in the embodiment of FIG. 5 has a concave first surface 114 and a convex second surface 115.

In FIGS. 1-3 a first apparatus for moving a deformable lens element 10 by application of a force to an external surface of the lens element is described. Alternative apparatuses wherein a force can be applied to a deformable lens element 10 to cause variation in an optical characteristic (e.g., lens element surface curvature, focal length) of a deformable lens element are now herein described.

Figure 6:
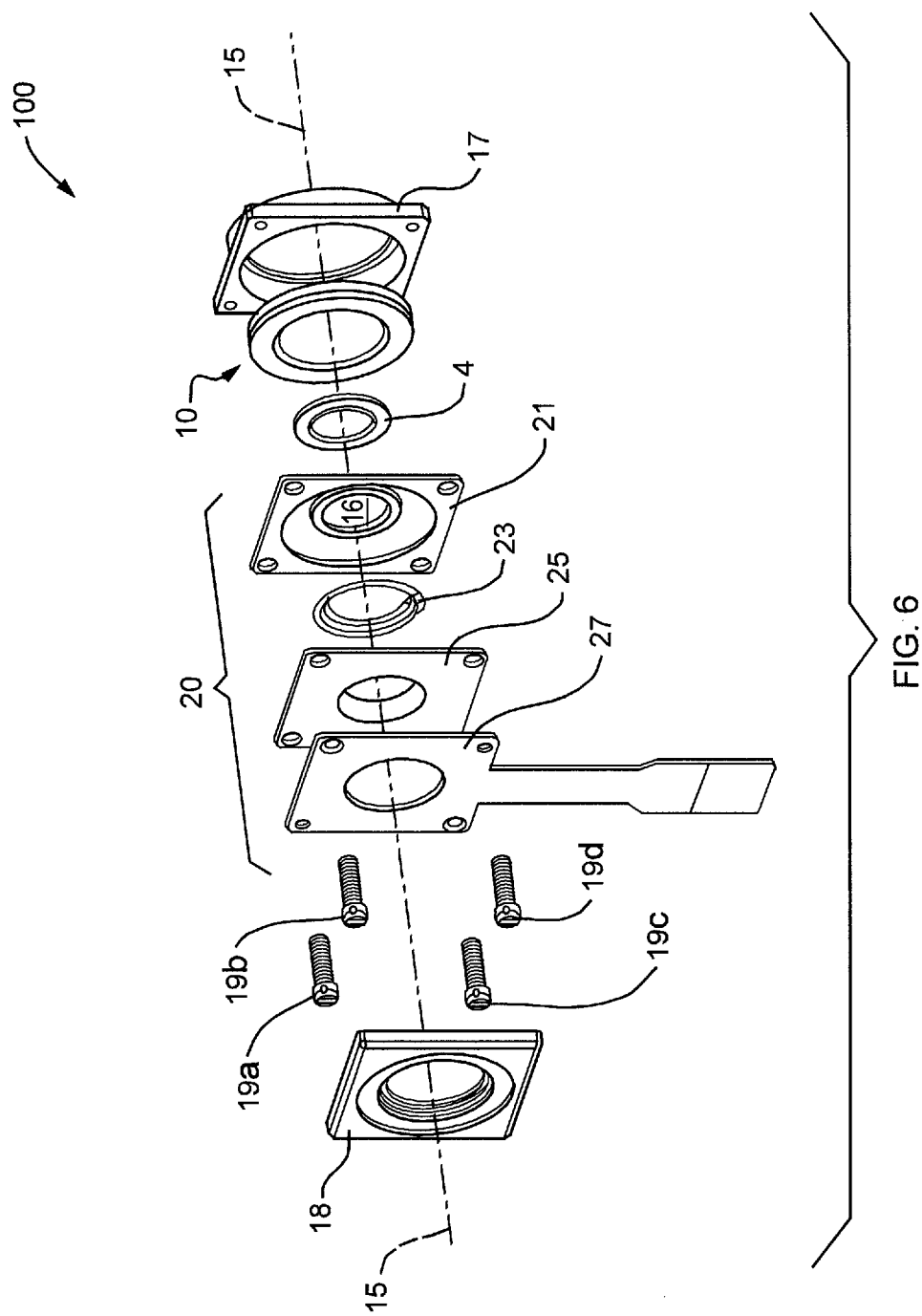
FIG. 6 is an exploded perspective assembly view of a focus apparatus incorporating a dielectric electro-active polymer actuator.

Referring now to the exploded assembly view of FIG. 6, an alternative embodiment of focus apparatus 100 is shown and described. In the embodiment of FIG. 6, deformable lens element 10 is provided by a modular assembly described more fully herein, and actuator 20 (shown in the embodiment of FIGS. 1-3 as being provided by an ion conductive electro-active polymer actuator) is provided in the embodiment of FIG. 6 by a dielectric electro-active polymer actuator 20.

Referring to actuator 20 in the embodiment of FIG. 6, actuator 20 can comprise a flexible member 21, a spring 23, a stopper 25 and flexible circuit board 27 for supplying voltage to flexible member 21. Referring to flexible member 21, flexible member 21 can comprise a dielectric film material interposed between flexible electrodes which can be provided e.g., by conductive carbon particles suspended in a polymer matrix. When a voltage is applied to the flexible electrodes, flexible member 21 expands in the direction perpendicular to the electric field lines. Spring 23 operates to bias flexible member 21 in a direction toward deformable lens element 10. Spring 23 shown as being provided by a conventional coil spring can substituted for by, e.g., pressurized fluid or resilient foam. Regarding stopper 25, stopper 25 operates to hold spring 23 at a certain position relative to flexible member 21 while flex circuit 27 supplies voltage to flexible member 21 having a distal end. When power is applied to flex circuit 27, the operation of which is described more fully herein, flexible member 21 expands to push flexible member 21 in the direction of lens element 10. More specifically, when power is applied to flex circuit 27, flexible member 21 pushes pressure ring 4 toward deformable lens element 10. Pressure ring 4 driven by actuator 20 thereby deforms deformable lens element 10 to change an optical property of deformable lens element 10. As in the embodiment of FIGS. 1-3, pressure element 4, (shown as being produced in a ring configuration) can be adapted to contact deformable lens element 10 at a plurality of positions about a periphery of deformable lens element 10. The plurality of contact positions are defined peripherally about and spaced apart from axis 15 of deformable lens element 10. As in the embodiment of FIGS. 1-3, apparatus 100 in the embodiment of FIG. 6 is adapted so that an optical property of a deformable lens element 10 is varied by applying a force generally in a direction of axis 15 at a plurality of contact points on deformable lens element 10 defined peripherally about axis 15.

Referring to further aspects of the focus apparatus of FIG. 6, focus apparatus 100 can be packaged with use of housing 17 sized and shaped to receive deformable lens element 10 in the modular assembly form shown in the embodiment of FIG. 6 and cover 18 which can be adapted to be snap fit onto bolts 19a, 19b, 19c, and 19d. Housing 17 can have a plurality of threaded holes aligned with holes of elements 21, 25, and flex circuit 27 as shown. Bolts 19a, 19b, 19c, and 19d can be driven through the aligned through holes and threaded into the shown threaded holes of housing 17 for assembly of apparatus 100. Focus apparatus 100 can be adapted so that one or more bolts 19a, 19b, 19c, and 19d conduct electrical current between flex circuit board 27 and flexible member 21. For example, flex circuit board 27 and flexible member 21 can be adapted so that bolt 19b connects a voltage terminal of flex circuit board 27 to a first flexible electrode of flexible member 21 and can further be adapted so that bolt 19c completes a conductive path between a second flexible electrode of flexible member 21 and flex circuit 27.

Figure 7:
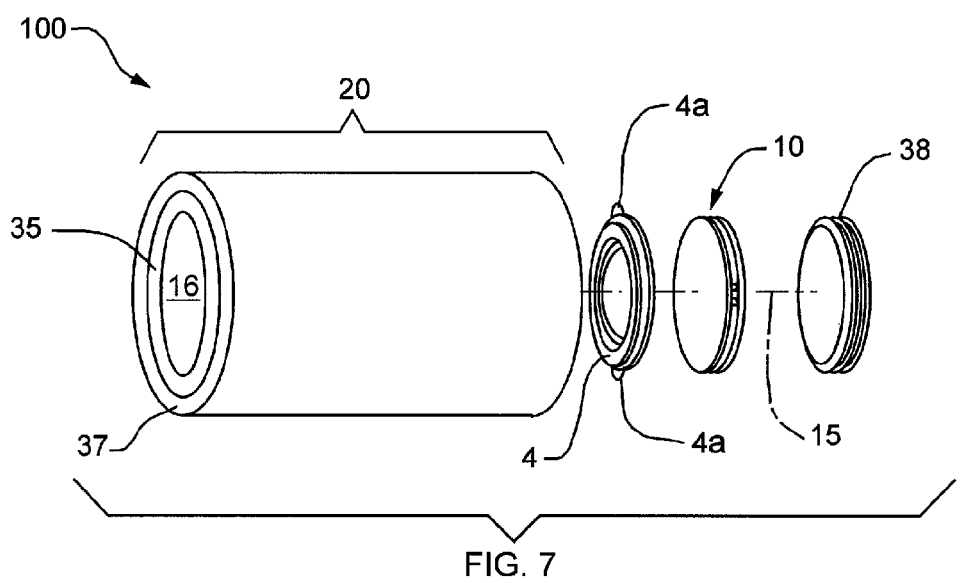
FIG. 7 is an exploded perspective view of a focus apparatus incorporating a deformable lens element and a hollow stepper motor.
Figure 8:
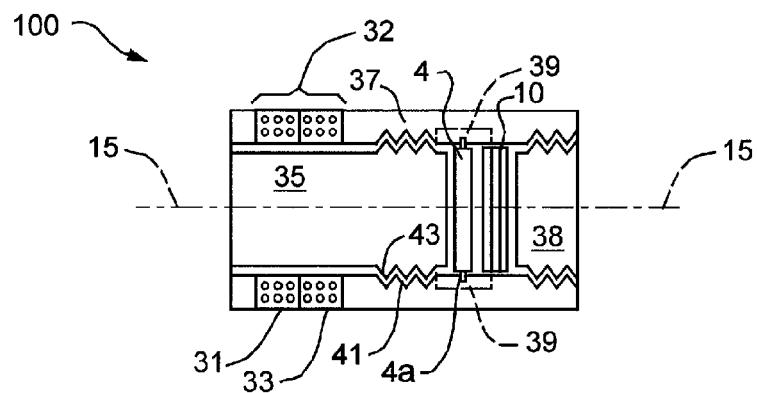
FIG. 8 is a cutaway side view of the focusing apparatus as shown in FIG. 7.
Figure 9:
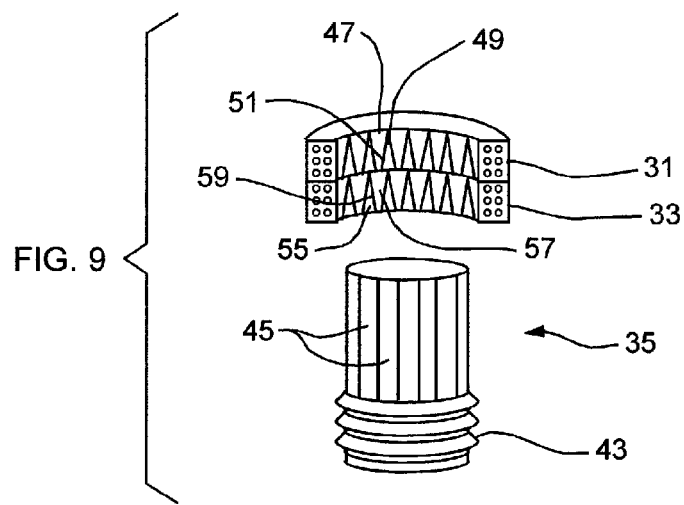
FIG. 9 is a perspective view illustrating operation of a hollow stepper motor in one embodiment.

Now referring to the embodiment of FIGS. 7-9, actuator 20 in the embodiment of FIGS. 7-9 is provided by a hollow stepper motor. Referring to operation of actuator 20 of the embodiment of FIGS. 7-9 provided by a hollow stepper motor, supplying current through one or both of coil 31 or coil 33 causes hollow rotor 35 threadably received on stationary barrel 37 to rotate in such manner that by rotating rotor 35 advances in either direction along axis 15 depending on the signals applied to coils 31 and 33. In the manner as shown in the embodiment of FIGS. 1-6, rotor 35 can be shaped so that an end of rotor 35 or a structure element transferring a force generated by rotor 35 contacts a surface of deformable lens element 10 at a plurality of positions peripherally disposed about and spaced apart from axis 15 thereof. When rotor 35 in the embodiment of FIGS. 7-9 is caused to rotate, rotor 35 while contacting deformable lens element 10 at such positions applies a force in a direction generally in the direction of axis 15 to cause an optical property of deformable lens element 10 to change. The force generated by actuator 20 can be transferred to lens element 10 by pressure element 4 as shown in FIGS. 7-8. Pressure element 4, in the embodiment of FIGS. 7-9, can have opposing pins 4a which ride on complementarily formed elongated slots 39 formed within barrel 37 so that rotation of pressure element 4 is resisted. Further regarding focus apparatus 100 of the embodiment of FIGS. 7-9, focus apparatus 100 can further include a cap 38 threadably received on barrel 35 as shown. Cap 38 has a transparent interior (not shown) to permit light to pass therethrough and forms a stopper resisting movement of deformable lens element 10 when rotor 35 is actuated to apply a force to an external surface of deformable lens element 10.

Operation of actuator 20 in the hollow stepper motor embodiment of FIGS. 7-9 is now further described. A hollow stepper motor, in one embodiment, generally is characterized by a permanent magnet equipped inner barrel, forming the rotor portion of the motor. A hollow stepper motor, in one embodiment, can further be characterized by a coil equipped outer barrel, supporting the inner barrel (rotor). Hollow stepper motors exhibit reduced size relative to other types of motors and allow for precision adjustment of lens element positions. In one embodiment, an inner barrel portion of a hollow stepper motor can include threads that are threadably received in threads of an outer barrel. With such a thread arrangement, the motor can sustain high impact relative to gear based motor arrangements. In one embodiment, threads for receiving an inner barrel in relation to an outer barrel can include threads complementarily configured so that an inner barrel is maintained at a position with respect to outer barrel 37 by way of frictional forces and without application of external energy. Accordingly, a lens setting can be controlled to remain at a certain setting simply by avoiding supplying current to a lens driver coil. By comparison, alternative actuators, while desirable in some instances, require applied power for maintaining a fixed lens setting. Accordingly, a major advantage of a hollow stepper motor, in one embodiment is reduced power consumption.

Regarding outer barrel 37, outer barrel 37 can comprise a set of coils 32 corresponding to inner barrel 35. A set of coils 32 includes first coil 31 and second coil 33.

Further, outer barrel 37 includes teeth 41 for engaging teeth 43 of inner barrel 35. The combination of teeth 41 and teeth 43 provide movement of inner barrel 35 along axis 15 when inner barrel 35 is caused to rotate.

Operation of an exemplary hollow stepper motor is further described with reference to FIG. 9. Inner barrel 35 can have permanent magnets 45 of alternating north and south polarity, which are alternately formed about the circumference of inner barrel 35. First coil 31 can have alternating teeth 47, 49 defined by gap 51. When current flows through coil 31 in a forward direction, magnetic fields of opposite polarity are formed at successively adjacent teeth, e.g., teeth 47, 49 of coil 31. When current flows through coil 31 in a backward direction, magnetic fields of opposite polarity are again formed at successively adjacent teeth of coil 31, except the polarity of the magnetic field is the opposite of its polarity during forward direction current flow. Similarly, second coil 33 can have alternating teeth 55, 57 defined by gap 59. When current flows through coil 33 in a forward direction, magnetic fields of opposite polarity are formed at successively adjacent teeth. When current flows through coil 33 in a backward direction, magnetic fields of opposite polarity are again formed at successively adjacent teeth of coil 33, except the polarity of the magnetic field is the opposite of its polarity during forward direction current flow.

For rotating inner barrel 35, current can be applied in forward and backward direction in first and second coil 31, 33 in a timed sequence coordinated manner to urge inner barrel 35 in a desired direction until a desired position of barrel 35 is achieved. When teeth of coil 31 or coil 33 have a certain polarity, it is seen that inner barrel 35 will have a certain position relative to outer barrel 37 such that permanent magnets thereof are aligned with teeth of coil 31 or coil 33. Thus, using the actuator 20 of FIGS. 7-9, precise positioning of lens elements can be achieved. The motor described with reference to FIGS. 7-9 is referred to as a hollow stepper motor since discrete stepwise positions of inner barrel 35 relative to outer barrel 37 can be achieved wherein permanent magnets of the barrel are aligned with coil teeth having a certain polarity.

Figure 5:
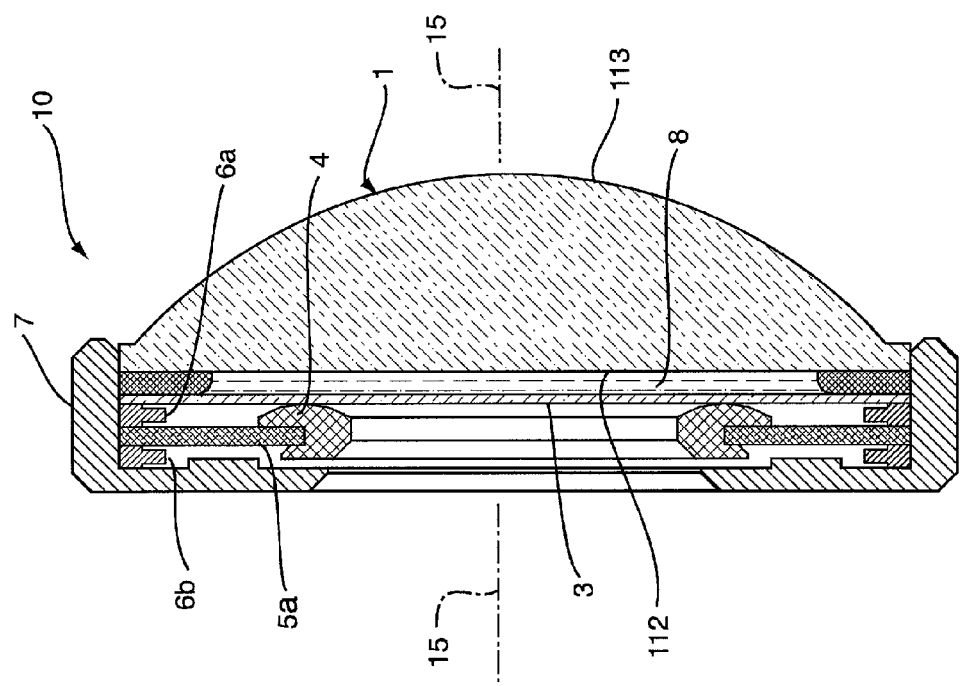
FIG. 5 is a cutaway side view showing an alternative embodiment of the deformable lens element of FIGS. 1-3.

With the end of inner barrel 35 being generally ring-shaped in the manner of pressure element 4, actuator 20, as shown in the embodiment of FIGS. 7-9 can operate substantially in the manner of the embodiment of FIGS. 1-3, and of FIG. 6. That is, actuator 20 as shown in FIGS. 7-9 can apply a force generally in the direction of axis 15. For application of the force, deformable lens element 10 as shown in FIG. 5 can be contacted at a plurality of contact positions defined on an exterior surface of deformable lens element 10 at a plurality of points spaced apart from axis 15 and peripherally disposed about axis 15.

Specific examples of various constructions of deformable lens element 10 which can be interchanged into any one of the embodiments of focus apparatus 100 described are described herein in connection with FIGS. 10-17.

In the embodiment of FIG. 10, deformable lens element 10 comprises first clamping element 63 second clamping element 65 and deformable membrane 3 interposed between first clamping element 63 and second clamping element 65. Each of the first and second clamping elements 63 and 65 can be transparent (optically clear) and disk shaped as shown and can include respective annularly disposed interlocking teeth. Specifically in the embodiment shown, clamping element 63 includes three annularly formed tooth rings 64 and clamping element 65 includes a pair of annularly disposed tooth rings 66 as best seen in FIGS. 11-12 that engage the teeth of the clamping element 63. While in the embodiment shown a plurality of annular rings are provided on each of clamping element 63 and clamping element 65 it is seen that a holding force between clamping element 63 and clamping element 65 would be aided by the presence of a fewer number of tooth rings, e.g., only a single annular tooth ring on one of the clamping elements. In such manner membrane 3 is clamped between clamping element 63 and clamping element 65.

Figure 4:
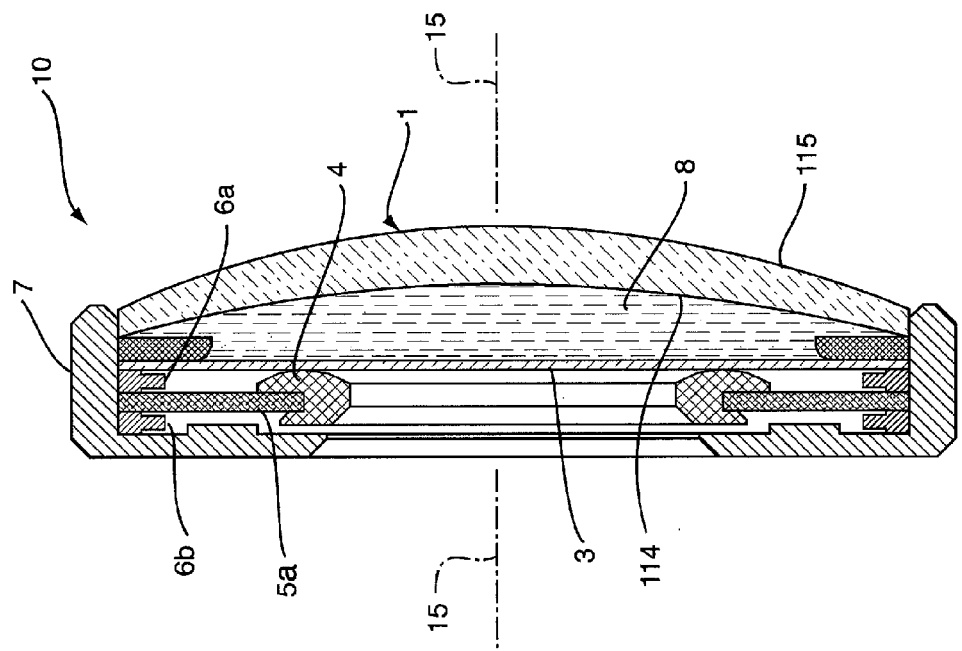
FIG. 4 is a cutaway side view showing an alternative embodiment of the deformable lens element of FIGS. 1-3.

For assembly of the deformable lens element of FIGS. 10-12, clamping element 65 can be press fit onto clamping element 63 and then can be ultrasonically welded thereto. In another aspect clamping element 63 and clamping element 65 can have complementary tongue and groove engaging surfaces at which an ultrasonic weld can be formed. In the embodiment of FIGS. 10-12, clamping element 63 includes an annular groove 71 (FIGS. 10-12) and clamping element 65 includes an annular tongue 73 (FIGS. 10-12). However, in an alternative embodiment, the location of the tongue and groove can be reversed. The ultrasonic weld at the interface between tongue and groove can be supplemented or replaced e.g., with an adhesive suitable for use with the material of the clamping elements. Planar optically clear window 67, as shown in the embodiment of FIG. 11, can be replaced with a curved surfaced member having an optical power. An alternative window for use with the deformable lens element as shown in FIGS. 10-12 can have, e.g., the curved surfaces of element 1, as shown in FIG. 4 (surfaces 112 and 113) and FIG. 5 (surfaces 114 and 115) herein.

In another aspect, clamping element 63 can have a transparent wall 67 allowing light to pass therethrough and can have a sufficient thickness to define a cavity 8 for receiving focus fluid or another deformable substance. After clamping element 63 and clamping element 65 are ultrasonically welded, focus fluid having an index of refraction greater than 1 (where the lens element incorporates a focus fluid) can be input into cavity 8 through hole 75. After the cavity is filled, the hole 75 can be sealed. Regarding clamping element 63 and clamping element 65 each of clamping element 63 and clamping element 65 can be formed of solid non-deformable material. Further, clamping element 65 can define an aperture 77 to allow a force supplying element (e.g., pressure element 4 or actuator 20 if pressure element 4 is deleted) to contact membrane 3.

Figure 13:
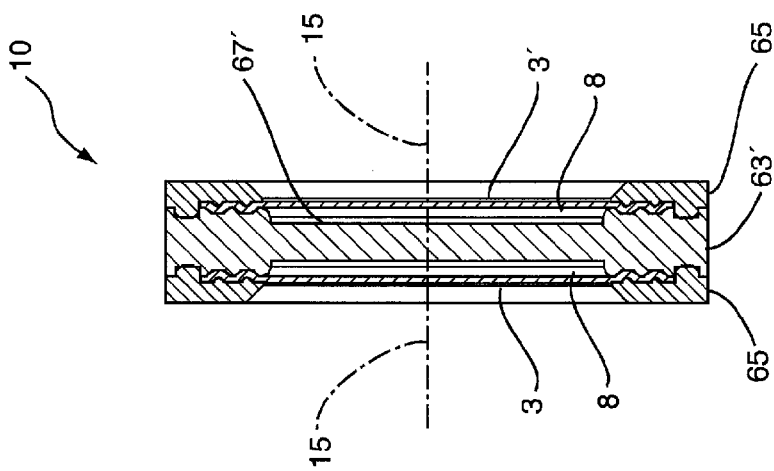
FIG. 13 is an assembled side view illustrating a deformable lens element having a pair of opposing light entry and light exit lens surfaces that comprise respective deformable membranes.

Another embodiment of deformable lens element 10 is shown and described in FIG. 13. In the embodiment of FIG. 13, deformable lens element 10 has a pair of deformable lens surfaces; namely, a first surface defined by first deformable membrane 3 and a second surface defined by second deformable membrane 3'. Deformable lens element 10 in the embodiment of FIG. 13 is constructed in the manner of the deformable lens element 10 of FIGS. 10-12 except that clamping element 63 holding deformable membrane 3 is repeated and clamping element 63 is modified for receipt of second membrane 3' and a second clamping element 65 on an opposite side thereon. In the embodiment of FIG. 13, it is seen that deformable lens element 10 has teeth as described in connection with the embodiment of FIGS. 10-12 for securely holding membranes and annular tongue and groove fasteners formed therein for securely holding a clamping element in relation to clamping element. Regarding window 67' of center clamping element 63', and where the lens element 10 incorporates a focus fluid, the window 67' can be formed so that a first and second fluid tight cavity for holding focus fluid are defined in the deformable lens element 10 of FIG. 13. Alternatively, the first and second cavities can be in fluid communication e.g., by way of through holes formed in a window 67'. Also, window 67' can be deleted and the cavities can be in fluid communication through an aperture defined by the inner most annular tooth ring of center clamping element 63'.

Figure 14:
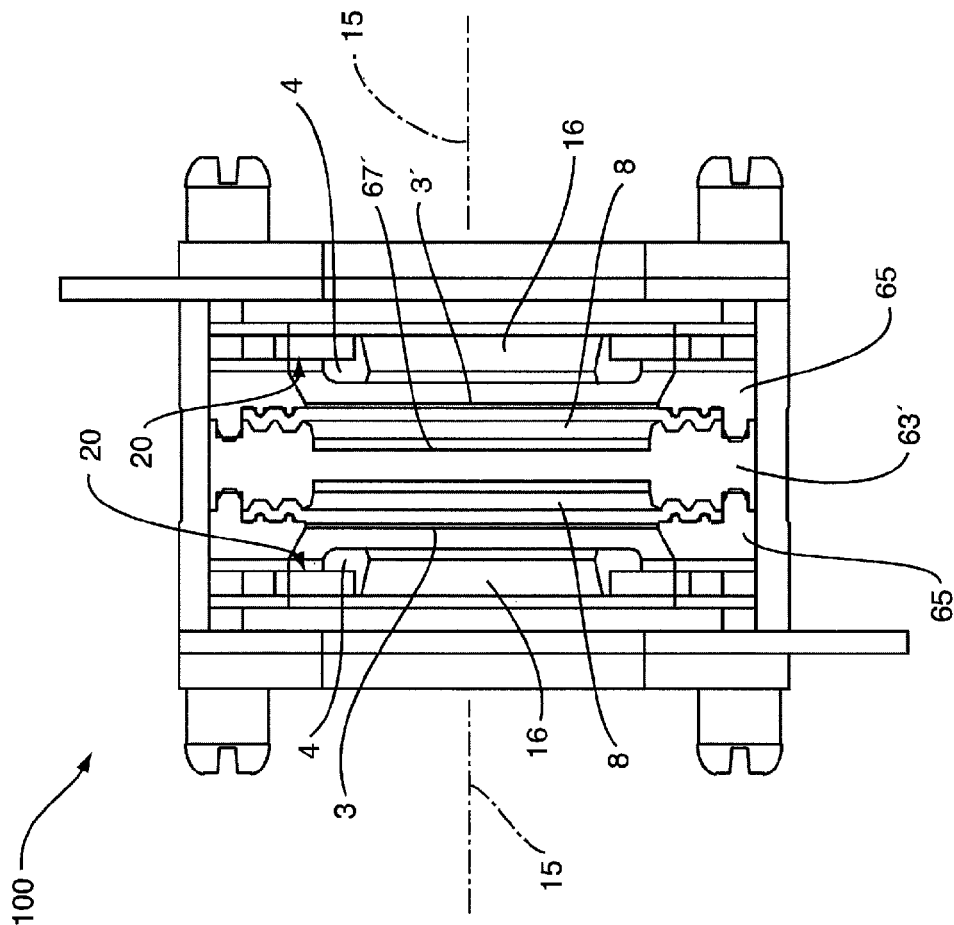
FIG. 14 is an assembled side view showing an embodiment of a focusing apparatus incorporating a deformable lens element as shown in FIG. 13, a first actuator for deforming a first deformable lens surface of the deformable lens element and a second actuator for deforming a second deformable lens surface of the deformable lens element.

Regarding FIG. 14, FIG. 14 shows an embodiment of a focus apparatus 100 incorporating the deformable lens element 10 shown in FIG. 13 wherein both of a light entry and light exit surface of the lens element 10 are deformable. Regarding the embodiment of FIG. 14, focus apparatus 100 can have a pair of actuators 20 disposed on either side of deformable lens element 10 including deformable membrane 3 and deformable membrane 3'. A first actuator 20 can be disposed as shown to impart a force on an exterior surface of first membrane 3 which may define a light entry surface of deformable lens element 10 and a second actuator 20 can be disposed as shown to impart a force on an exterior surface of second membrane 3' which may define a light exit surface of lens element 10. In the embodiment of FIG. 14, both of the first and second actuators can have the characteristics described with reference to the embodiment of FIGS. 1-3. For example, both of the actuators 20 can be disposed so that an aperture 16 of the actuator 20 is disposed about an axis 15 of deformable lens element 10. Each of the actuators 20 can be further arranged so that a force generated by the actuator 20 is imparted to the lens element 10 in a direction generally coextensive with axis 15 and further so that the deformable surface of the deformable lens element 10 is in contact at a plurality of contact positions spaced apart from and peripherally disposed about axis 15. In one embodiment of an optical system incorporating the lens element 10 of FIG. 13, membrane 3 can form a light entry surface of the lens element and membrane 3' can form a light exit surface. In another embodiment, lens membrane 3' forms a light entry surface of the lens element and membrane 3 forms a light exit surface.

Further regarding the focus apparatus 100, it is seen that the first and second actuators 20 have apertures 16 disposed about, and in one embodiment, substantially centered on axis 15 of deformable lens element 10 in such manner that a first of the actuators imparts a force in a direction generally coextensive with the axis 15 on a light entry deformable lens surface of the lens element while a second of the actuators 20 imparts a force in a general direction of axis 15 on a light exit surface of the deformable lens element 10.

It is seen that the deformable lens element 10 of FIG. 13 arranged with appropriate actuators as shown in FIG. 14 can be controlled to exhibit a variety of major lens element configurations, e.g., planar convex, planar concave, bi-convex, bi-concave, concave-convex, meniscus, bi-convex with non-equal surface power.

Regarding deformable membrane 3 and membrane 3' in the various embodiments of deformable lens element 10, the deformable membranes can comprise nonporous optically clear elastomer material. A suitable material for use as membrane 3, 3' is SYLGARD 184 Silicon elastomer, of the type available from DOW CORNING.

Regarding cavities 8 described in the various embodiments, cavities 8 can be filled with optically clear focus fluid. Selecting a focus fluid with a relatively high index of refraction will reduce the amount of deformation needed to obtain a given change in focal distance. In one example, a suitable index of refraction would be in the range of from about 1.3 to about 1.7. Selecting a focus fluid with a smaller index of refraction is advantageous where it is desired to increase the amount of deformation needed to obtain a given change in focal distance. For example, in some embodiments where a selected actuator 20 generates relatively coarse movements, a focus fluid having a lower index of refraction might be selected. One example of a suitable focus fluid (optical fluid) is SL-5267 OPTICAL FLUID, available from SANTOLIGHT, refractive index=1.67.

Further regarding cavities 8 of the various embodiments, the cavities can be filled with an alterative deformable optically clear substance having an index of refraction greater than 1 that does not, in the manner of a fluid, assume the shape of its respective cavity 8 when of greater volume than the substance. For example, a deformable shape retaining material which can substantially retain its unstressed shape throughout its lifetime can be disposed in cavity 8 in each of the various embodiments of deformable lens element 10.

In one example, a silicon gel can be provided as a resiliently deformable shape retaining material that substantially retains its unstressed shape over the course of its lifetime. A resiliently deformable silicon gel can be disposed in cavity 8 of any of the described embodiments. For manufacture of a suitable silicon gel for use with a deformable lens element 10 described herein, liquid silicon can be filled into a container of the desired shape of completed gel member and then cured. In one example, the liquid silicon can be filled into a mold in the shape of cavity 8 into which the silicon gel member will be disposed, and then cured until in silicon gel form.

Further, with reference to manufacture of a resiliently deformable member, a mold core can be prepared with aluminum by single point diamond turning and nickel plating. The cavities can have the negative shape of the resiliently deformable lens element to be made. Next, a silicon gel mixture can be prepared such as DOW CORNING JCR6115 two part silicon Heat Cure gel. The two parts, JCR6115

CLEAR A and JCR6115 CLEAR B are mixed to form a mixture. The mixture can be vacuumed to release bubbles formed therein. With the liquid silicon gel prepared, the liquid silicon gel can be injection molded into the mold core. The liquid silicon gel can then be cured under an elevated temperature. Where JCR6115 liquid silicon available from DOW CORNING is used, the liquid gel can be cured by heating for 5 minutes at 175 degrees. The completed silicon gel lens can then be inspected to determine whether it is free of defects and extra material can be removed around the gate area. Optionally, the finished resiliently deformable member can be spin coated with a thin membrane material e.g., SYLGARD 184 from DOW CORNING to improve durability. Several materials that can be utilized in the form of a resiliently deformable member for as in a deformable lens element or component thereof are summarized in Table A below. In each of the exemplary embodiments, the material constituting a major body of a deformable lens element (including some instances the entire resiliently deformable lens element) has a hardness measurement of less than Shore A 60.

TABLE A

| Example | Material and Sample Characteristics |
|---|---|
| 1 | Dow Corning, JCR6115, Two Part, Fast Heat Cure, Low Modules Gel With Low Viscosity And Very Long Working Time. Cure 5 minutes @ 175° C., Refractive Index 1.404, Young's Modulus 0.2 MPa, Operation Temperature - 45°-200° C., Elongation 130%, Hardness, Shore A 13 |
| 2 | Opti-tec, Optically Clear Silicon Rubber. Cure 1 hour @ 100° C., Refractive Index 1.406, Operation Temperature - 60°-200° C., Elongation 100%, Hardness, Shore A 40 |
| 3 | Rogers, BISCO HT-6240 Liquid Silicon Rubber Sheet. Optical: Clear, Operation Temperature - 80°-425° C., Elongation 250%, Hardness, Shore A 40 |
| 4 | Dow Corning, SYLGARD ® 184 SILICONE ELASTOMER. Cure 10 minutes @ 150° C., Refractive Index 1.430, Young's Modulus 2.0 MPa, Operation Temperature - 45°-200° C., Elongation 140%, Hardness, Shore A 50 |

In each of the exemplary embodiments, the material forming a resiliently deformable member is provided by an optically clear silicon gel elastomer having an index of refraction greater than 1. However, it will be understood that any optically clear resiliently deformable material having an index of refraction greater than 1 can be utilized in the manufacture of a deformable lens element.

When in a silicon gel form the formed silicon gel member can be disposed in cavity 8. It will be seen that whereas filling focus fluid and sealing can normally be last steps in a lens element manufacturing method where a lens element incorporates a fluid, disposing a gel member in a cavity can normally be an intermediate step in the manufacture of a gel based deformable lens element.

Referring to FIG. 15, another embodiment of deformable lens element 10 is illustrated. The embodiment of FIG. 15 has a construction similar to that of the embodiment of FIGS. 10-12 with resiliently deformable lens member 80 disposed (e.g., comprising silicon gel) in a cavity delimited by clamping member 63 and clamping member 65 in place of focus fluid. Further regarding the embodiment of FIG. 15, pressure element 4 provided by a push ring is mechanically coupled to clamping member 65 for purposes of aiding the alignment of pressure element 4 with deformable membrane 3.

Where a deformable lens element incorporates a deformable shape retaining material such as can be provided by silicon gel, features of deformable lens element 10 for sealing of cavity 8 can be optionally deleted. In the embodiment of FIG. 16, cavity 8 is deleted and deformable lens element 10 comprises a stacked layer construction including resiliently deformable material member 80, deformable membrane 3, back plate 81 and forward plate 82 adapted to mechanically couple pressure element 4 as shown.

Where deformable lens element 10 incorporates a shape retaining resiliently deformable member such as a deformable member comprising silicon gel as described herein, deformable membrane 3 can be optionally deleted. Nevertheless, with membrane 3, resiliently deformable member 80 may be advantageously protected and the incidence of scratches on the surface of resiliently deformable member 80 can be reduced. Additionally or alternatively for protecting resiliently deformable member 80, member 80 may be subject to a coating processing wherein optically clear protective coating 84, such as may comprise SYLGARD 184 from DOW CORNING can be applied to gel member 80 as has been described herein. An example of a deformable lens element 10 comprising a resiliently deformable member 80 and a surface protective coating 84 is shown in FIG. 17.

It has been mentioned that a process for manufacture of a shape retaining resiliently deformable optically clear member can include filling a container of a desired shape of the finished member and then curing. In one embodiment, a shape retaining resiliently deformable member, as described herein can be formed to have an initial optical power. In one embodiment, a shape retaining resiliently deformable member can be formed so that in an unstressed state the deformable member has at least one convex lens surface.

Figure 18:
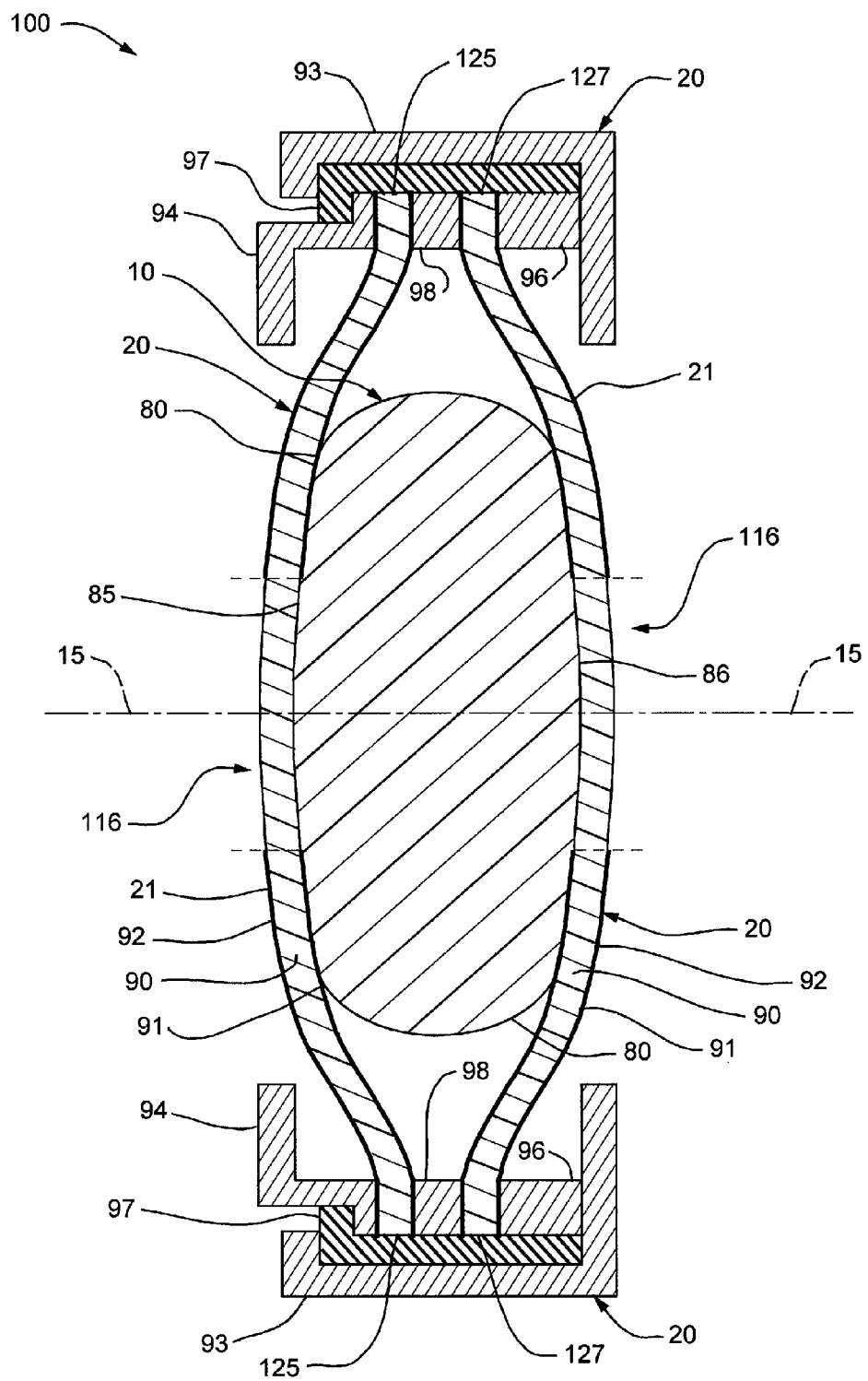
FIG. 18 is an assembled side view of a focus apparatus having a deformable lens element and a pair of flexible member actuators, wherein the flexible members are adapted to substantially conform to the shape of the deformable lens element.

In the embodiment of a focus apparatus 100 as shown in FIG. 18, resiliently deformable member 80 can be formed to have an initial optical power, and is specially configured so that in an unstressed state resiliently deformable member 80 has a first normally (unstressed state) convex surface 85 and a second normally (unstressed state) convex surface 86. One of the lens surfaces 85 or 86 can be regarding as a light entry surface and the other a light exit surface. Further respecting the focus apparatus 100 of FIG. 18, first and second electroactive polymer actuators 20 can be disposed to deform each of the first and second normally convex surfaces. In one embodiment of FIG. 18, lens element 10 is shown as being provided as a one piece member consisting of resiliently deformable member 80. In the embodiment of FIG. 18, as well as in the remaining embodiments described wherein a major body of the deformable lens element 10 comprises a resiliently deformable material member, deformable lens element 10 can be devoid of a focus fluid.

In the exemplary embodiment of FIG. 18, actuators 20 for deforming deformable lens element 10 can comprise dielectric electro-active polymer flexible members 21 as described previously in connection with the embodiment of FIG. 6. In the embodiment as shown in FIGS. 18-19, flexible members 21 are normally biased outward by resiliently deformable member 80 and hence spring 23 is not included in the embodiment of FIGS. 18 and 19. Also, pressure element 4 is deleted in the embodiment of FIGS. 18 and 19 and the force imparting structural element in the embodiment of FIG. 18 and FIG. 19 is provided by actuator 20. Each flexible member 21 can be disposed to contact deformable lens element 10 provided in the embodiment of FIGS. 18 and 19 by a one piece resiliently deformable member which in one embodiment comprises a silicon gel. Specifically with reference to the embodiment of FIGS. 18 and 19, each flexible member 21 can be adapted to substantially conform to the unstressed shape of a deformable lens element provided in the embodiment shown by a one piece resiliently deformable member 80. As in the embodiment of FIG. 18, each flexible member 21 can include dielectric film material layer 90 interposed between a pair of flexible electrode layers 91 and 92 such that by varying the voltage between the flexible electrode layers, the flexible member expands or contracts. In another embodiment the single dielectric layer 90 can be replaced by multiple dielectric layers. Further referring to the focusing apparatus 100 of FIG. 18, each flexible member 21 can include an uncoated area 116 disposed about lens element axis 15 to allow light rays to pass through deformable lens element 10.

Uncoated areas 116 in the embodiment of FIG. 18 are areas devoid of flexible electrode coating which coating can cover the remainder of the internal and external surfaces of flexible member 21 in areas other than the uncoated areas 116. For providing dielectric layer 90 in an optically clear form for permitting light to pass there through, dielectric layer 90 can comprise a suitable optically clear material, examples of which include Acrylic, model number VHB4910, available from 3M, and model number CF19-2186 Silicon available from NUSIL. For manufacture of a flexible member 21 as shown in the embodiment of FIG. 18, an optically clear muscle dielectric material can be spin cured on a carrier substrate (glass plate) to form a uniform thin film. The film can then be cured at an elevated temperature. After curing, the film can be detached from the substrate and electro-chemically coated to form a flexible electrical coating except in uncoated areas 116. The formed flexible member can be cut to appropriate size and mounted. In a further aspect, when voltage is applied to contract a flexible member 21, the resulting force initially generated in a direction generally perpendicular to axis 15 is imparted to deformable lens element 10 generally in the direction of axis 15 toward lens element 10 in such manner that the convexity of lens element is increased. With apertures 16 ring-shaped and disposed about axis 15 and with flexible member 21 adapted to substantially conform to the shape of deformable lens element, a contraction of a flexible member 21 results in forces generally in the direction of axis 15 toward deformable lens element being imparted at a plurality points peripherally disposed about and spaced apart from axis 15. While the force imparted to lens element 10 by actuators 20 in the embodiment of FIG. 18 can be described as being generally in the direction of lens element axis 15, it is understood that if the forces imparted are broken down into normal (axis directed) and transverse (perpendicular to axis 15) constituent component force vectors in the embodiment of FIG. 18 can be expected to have a higher percentage of transverse component force vectors than in the embodiments described herein with reference to FIGS. 1-9.

Further regarding focus apparatus 100 as described in FIG. 18, voltage terminals can be provided in such manner as to appropriately supply voltages across the flexible electrode layers 91 and 92 of the respective first and second flexible members 21 shown. Voltage terminals as will be described in an exemplary embodiment can also be provided to structurally support flexible members 21 in a certain position in relation to lens element 10 and the flexible members 21 in turn support resiliently deformable lens element 10. In the embodiment shown in FIG. 18, imaginary lines connecting terminal connecting interfaces 125 and interfaces 127 (where a first flexible member 21 is connected to conductive rings 94 and 98 and a second flexible member is connected to conductive rings 98 and 96) can bisect deformable lens element 10. In such manner the flexible member 21 in the embodiment shown can impart a force generally in the direction of axis 15 toward lens element 10 when controlled to move to a contracted state.

The components of the embodiment of FIG. 18 are further described with reference to FIG. 19 showing an exploded assembly view of the embodiment in accordance with FIG. 18. Referring to the view of FIG. 19, it is further seen that focus apparatus 100 includes bi-convex resilient (shape-retaining) deformable lens element 10 provided by one piece deformable member 80 interposed between a pair of flexible members 21 of first and second actuators 20 adapted to substantially conform to the shape of deformable lens element 10 when in an unstressed state. Referring to further aspects of focus apparatus 100 as shown in FIG. 19, focus apparatus 100 can further include housing elements 93, conductive rings 96 and 94, insulating sleeve 97, and center conductive rings 98. Conductive ring 94, center ring 98, and conductive ring 96 are fitted inside insulating sleeve 97, which is disposed to prevent a short between housing element 93 and conductive ring 94 and between housing element 93 and center conductive ring 98. In a further aspect, conductive ring 96 can be in conductive contact with conductive housing element 93. For actuating of first and second actuators 20 having first and second flexible members 21, a voltage can be applied across housing 93 (in conductive contact with conductive ring 96) and conductive ring 94. In the embodiment shown, center conductive ring 98 operates as a node in a series circuit that comprises the respective dielectric layers of a first flexible member 21 and second flexible member 21, wherein the node connects the noted elements. Application of a voltage across housing 93 (and therefore ring 96) and ring 94 can cause the first (disposed between ring 94 and ring 98) and second (disposed between ring 96 and ring 98) flexible members 21 to be actuated simultaneously. In another embodiment center conductive ring 98 can be in electrical communication with a reference voltage and voltages can be applied between the conductive ring 96 and ring 98 and also between ring 94 and ring 98 for independent control of the first and second flexible members 21 of the first and second actuators 20. The various elements of FIGS. 18 and 19 can be sized to be frictionally fit so that the elements are in certain relative position when apparatus 100 is fully assembled.

In another embodiment, the dielectric electro-active polymer actuator as shown in FIGS. 18-19 can be replaced by an ion conductive electro-active polymer actuator, as described previously herein. An ion conductive polymer actuator can have the configuration of the actuator as depicted in FIGS. 18-19, except that optically clear dielectric layer 90 can be replaced with one or more optically ion conductive polymer layers.

Where the actuator 20 as shown in FIGS. 18-19 represents a dielectric electro-active polymer actuator the actuator can generate force (by contraction of the actuator) in a direction generally perpendicular to axis 15, which force is imparted to a deformable surface of lens element 10 in a direction that is generally in the direction of axis 15. Where actuator 20 in the embodiment of FIGS. 18-19 represents an ion conductive polymer actuator, the actuator can generate a force in a direction generally in the direction of axis 15 (by bending of the ion conductive layer) which force is imparted to a deformable surface of lens element generally in the direction of axis 15. The voltage requirements of focus apparatus 100 can be reduced (e.g., to less that 10 volts) with selection of an ion conductive electro-active polymer actuator.

In the embodiments having an electro-active polymer actuator 20 with an uncoated area region 116 (e.g., either of the dielectric type or an ion conductive type), the uncoated area 116 can be replaced with an aperture 16 so that the actuator 20 operates in the manner of a force imparting structural element having an aperture 16 as described herein.

Also embodiments herein having force imparting elements including an aperture, the aperture 16 can be filled with an optically clear material member so that the force imparting structural element operates in the manner of the actuator of FIGS. 18-19. As has been described herein, the actuator in any of the described embodiments can be substituted for by an actuator of any of the remaining embodiments. Likewise the deformable lens element in any of the described embodiments can be substituted for by a deformable lens element of any of the remaining embodiments.

While the embodiments of FIGS. 18 and 19 include a deformable bi-convex lens element and an actuator for deforming each of a pair of lens surfaces, it is seen that focus apparatus 100 could alternatively comprise a plano-convex resiliently deformable shape-retaining lens element and a single actuator for deforming the normally convex lens surface.

In any of the described embodiments wherein a force generated by actuator 20 is transferred to deformable lens element 10 by pressure element 4, it is understood that pressure element 4 can be deleted and that a force generated by actuator 20 can be imparted on deformable lens element 10 directly by actuator 20. For imparting a force on deformable lens element 10, it has been described that a structural element; namely pressure element 4 or actuator 20 (if the focus apparatus is devoid of pressure element 4), can "contact" a deformable lens element at a plurality of contact positions, or otherwise impart a force to a deformable lens element at a plurality of force impartation points.

In one embodiment of a "contacting" relationship between a structural element and deformable lens element as described herein, the force-applying structural element can be in separable contact with the deformable lens element, meaning that the force supplying the structural element can be freely separated from the deformable lens element. In another embodiment of a "contacting" relationship described herein, the force-applying structural element can be in secure contact with the deformable lens element, meaning that it is adhered to, welded to, biased toward, or otherwise connected to the deformable lens element.

In another embodiment, the force-applying structural element, (e.g., the actuator or pressure element) is integrally formed with the deformable lens element, meaning that the force applying structural element is part of a one piece member, a part of which forms the force applying structural element, and a part of which forms at least a part of deformable lens element 10.

Where the force applying structural element is in secure contacting relationship with a deformable surface of the deformable lens element or is integrally formed with the deformable surface, a pulling force generated by actuator 20 (i.e., in the direction of axis 15 but away from deformable lens element 10) can operate to deform the deformable lens element. A pulling force imparted on a surface of a deformable lens element imparted at a plurality of points peripherally disposed about and spaced apart from axis 15 can be expected to decrease a convexity or increase a concavity of the deformable surface where the force applying structural element is ring shaped. Where a force applying structural element (member) is ring shaped as described herein, the force applying structural element can impart a force to a deformable lens element at a plurality of points spaced apart from and peripherally disposed about axis 15 of lens element 10. The force applying structural element can impart a force at a plurality of points spaced apart from and peripherally disposed about axis 15 whether the force applying element is in separable contacting, secure contacting, or whether the force applying structural elements is integrally formed with the deformable lens element. Force can be imparted to a deformable surface of a deformable lens element at a plurality of force impartation points having characteristics that vary depending on the shape of the force imparting structural element. Where the force imparting element is ring shaped, a plurality of force impartation points can be formed in a ring pattern about axis 15. Ring shaped force imparting elements as described herein have been shown as being circular; however, ring shaped force applying elements can also be oval, asymmetrically arcuate, or polygonal. Where a force imparting element is ring shaped, force imparting points of a deformable surface, at least a part of which transmits image forming light rays, do not include points within a two dimensional area about axis 15 delimited by the plurality of force imparting points in a ring pattern peripherally disposed about axis 15.

Figure 21:
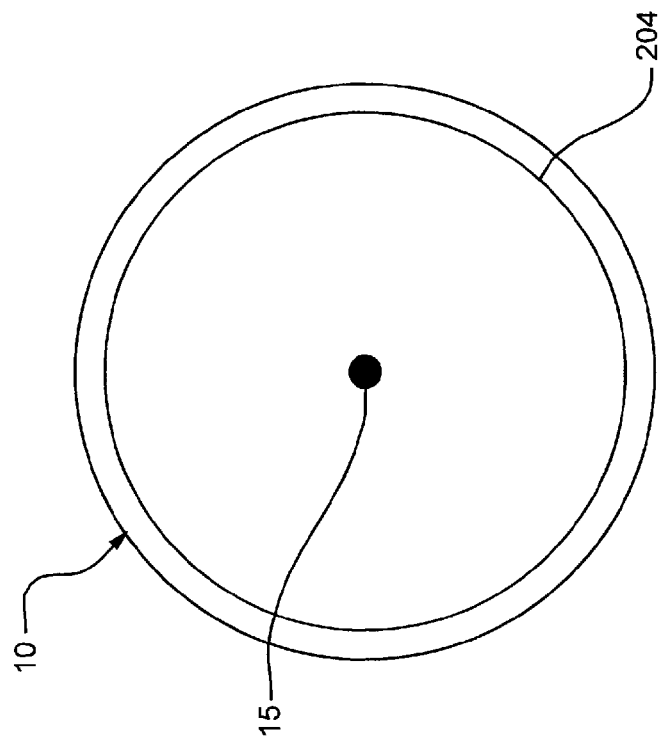
FIG. 20 and FIG. 21 are force impartation diagrams illustrating exemplary force impartation positions for a deformable lens member, showing front views of a deformable lens element looking in the direction of an imaging axis.
Figure 20:
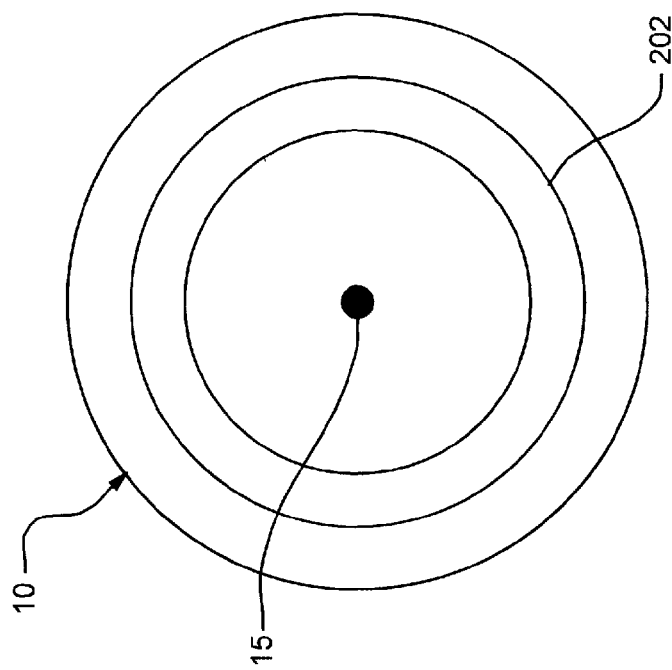

In the embodiment of FIGS. 18 and 19, an actuator can impart a force to deformable surface of a deformable lens element generally in the direction of axis 15; however, in the embodiment of FIGS. 18 and 19, the force impartation points are not formed in a ring pattern that excludes points within a two dimensional area about axis 15. In the embodiment of FIGS. 18 and 19, force impartation points include points within a two dimensional area about axis 15 of a deformable surface at least part of which transmits image forming light rays. In one embodiment, the force impartation points can be points of a surface of deformable lens element 10 facing an exterior of deformable lens element 10. Force impartation points in various examples are depicted in FIGS. 20 and 21, wherein FIG. 20 shows an exemplary view of force impartation points being defined in a ring pattern 202 at a plurality of points peripherally disposed about and spaced apart from axis 15, and FIG. 21 shows an exemplary depiction of force impartation points defined in an area pattern 204, wherein force impartation points include points defining a two dimensional area about axis 15. Characteristics of exemplary force impartation profiles are described further in connection with Table B. Where a force imparting element is ring shaped, a pushing force imparted to a deformable surface of deformable lens element 10 in a direction of the element 10 can increase a convexity of the surface by encouraging the surface to bulge outwardly along an axis and decrease in thickness along a plurality of imaginary lines that run parallel to the axis, and which are spaced apart from and peripherally disposed about axis 15. Where an area force imparting element e.g., as shown in the embodiment of FIGS. 18 and 19, is utilized, imparting a pushing force in the direction of deformable lens element 10, and the deformable element is normally convex, the imparted force results in flattening, or a reduction of the convexity of the surface. Further characteristics of embodiments having the described exemplary force impartation profiles are summarized in Table B.

were applied to the actuator's flexible electrodes. The results are summarized in Table C below:

TABLE B

| Force Impartation Profiles | Exemplary Embodiment | Exemplary Direction of Force | Force Impartation Points | Result of "Pushing" Force | Result of "Pulling" Force (where force imparting structural element is adhered to or integrally formed with a deformable surface) |
|---|---|---|---|---|---|
| Ring Shaped, spaced apart from and peripherally disposed about axis 15 | FIGS. 1-9, 14 | Generally along axis 15 | Defined at a plurality of positions forming a ring pattern at a plurality of positions peripherally disposed and spaced apart from axis 15 | A bulge can be formed at the center areas defined by the ring pattern to increase a convexity of the deformable lens element surface about axis 15 | Convexity can be reduced and if a pulling force is sufficient, a concave lens element surface can be formed |
| Area, disposed about axis 15 | FIGS. 18-19 | Generally along axis. Where actuator is an dielectric EAP actuator, force vectors will include a greater percentage of transverse-to-axis component vectors than in an embodiment where a force imparting structural element is provided by a push ring. | Defined at a plurality of positions forming an area pattern disposed about axis 15 | Deformable lens element "flattens" to decrease convexity, or otherwise reduces a thickness of the deformable lens element along axis 15 | Thickness of deformable surface can increase along axis 15, to increase a convexity of the deformable lens surface in an area about axis 15. |

In the embodiment of FIGS. 1-19, focus apparatus 100 can be adapted so that an infinitesimal change in the position of actuator 20 provides a significant change in the focus position of an optical imaging system in which apparatus 100 is incorporated. Specific performance characteristics that can be realized with use of focus apparatus 100 as described herein are described with reference to the following example.

It will be seen from the embodiments of FIGS. 1-19 that the actuator and lens elements can be interchanged in any combination among the embodiments.

EXAMPLE 1

A focus apparatus for use in focusing having a structure substantially according to that shown in FIG. 6 is constructed and fitted onto a lens triplet imaging lens assembly of an IT5000 Image Engine of the type available from Hand Held Products, Inc. having a focal length of 5.88 mm, an F# of 6.6 and a nominal fixed best focus distance of 36 inches. An actuator from ARTIFICIAL MUSCLE INCORPORATED ("AMI") based on the design of an MLP-95 or MSP-95 autofocus muscle actuator available from AMI, Inc. was used. After the focus element was constructed, various voltages

TABLE C

| VOLTAGE (volts) | DISTANCE MOVEMENT OF ACTUATOR (20) AND PRESSURE ELEMENT (4) | BEST FOCUS DISTANCE |
|---|---|---|
| 0 | 0 | 36" |
| 600 | 0.025 mm | 8" |
| 790 | 0.050 mm | 6" |
| 896 | 0.075 mm | 3" |

It was observed that large variations in the best focus distance could be realized with infinitesimal movement of an actuator applying a force to a deformable lens element.

End of Example 1

Various arrangements of the described deformable lens element in various imaging systems are now described.

Apparatus 100 comprising deformable lens element 10 moveable by way of force applied to an external surface thereof can be incorporated in an optical imaging system (which may alternatively be termed a lens assembly) comprising apparatus 100 and one or more additional lens elements arranged in a series with the apparatus. The one or more additional lens elements can comprise deformable or non-deformable lens elements. When apparatus 100 is arranged in series with a far focused imaging lens assembly (not shown) focused at infinity, the state (lens without curvature or planar) depicted e.g., in FIG. 3 will achieve a far focus and the state depicted in FIG. 2 (convex lens) will achieve a near focus.

Figure 22:
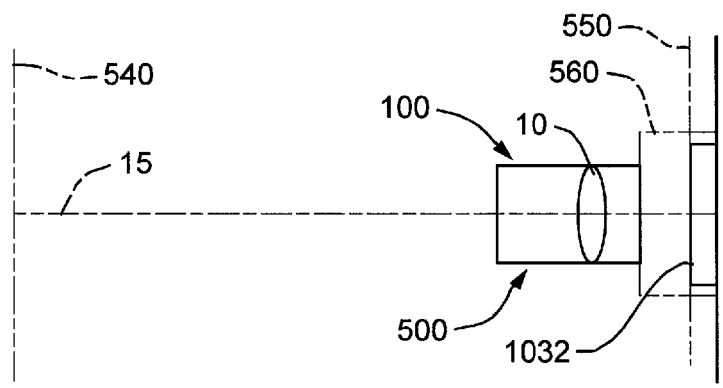
FIGS. 22-24 are side schematic views illustrating various lens assemblies incorporating at least one deformable lens element.
Figure 23:
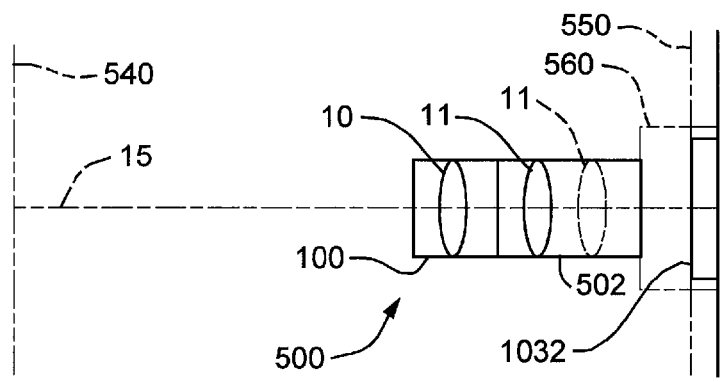
Figure 24:
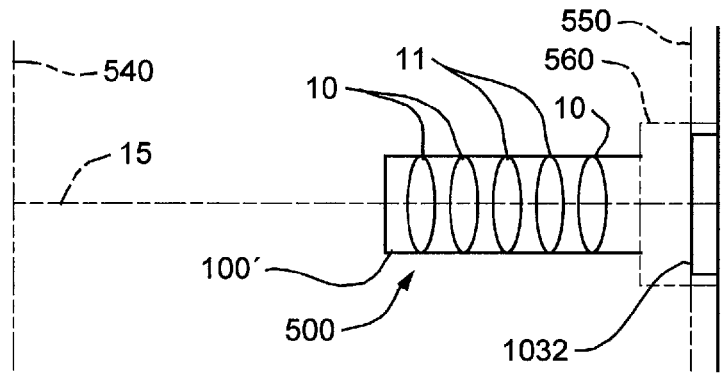

In the embodiment of FIG. 22, lens assembly 500 (which can also be referred to as an "optical imaging system") for transmission of image forming light rays comprises a single deformable lens element 10 disposed in a focus apparatus 100 according to any one of the embodiments discussed herein. For increasing an optical power of an imaging lens assembly comprising a single deformable lens element, the lens element can be provided in a form capable of double convex configuration. In the embodiment of FIG. 23, imaging system 500, for transmission of image forming light rays, comprises a single deformable lens element 10 disposed in a focus apparatus 100 according to any one of the embodiments discussed herein in combination with subassembly 502. More specifically, focus apparatus 100 as shown in FIG. 23 is disposed in series with a lens subassembly 502 comprising one or more (as indicated by the dashed in element) rigid non-deformable lens elements 11. Regarding lens assembly 500 as shown in FIG. 23, focus apparatus 100 can be an add-on unit detachably received on lens subassembly 502. In the embodiment of FIG. 24, lens assembly 500 comprises a plurality of deformable lens elements 10 disposed in a modified focus apparatus 100' modified to include actuators for actuating a plurality of deformable lens elements 10. Lens assembly 500 in the embodiment of FIG. 24 further comprises a plurality of rigid non-deformable lens elements 11. Lens assembly 500 in each of the embodiments of FIGS. 22, 23, and 24 is disposed in association with an object plane 540, and an image plane 550 partially defined by image sensor 1032. Image sensor 1032 can be shielded from stray light rays by shroud 560, which can be integrally formed with a housing of lens assembly 500. Where lens assembly 500 includes more than a single deformable lens element 10, such additional lens elements can be aligned such that the axes of such additional elements are coincident with axis 15. Accordingly, where lens assembly 500 includes a plurality of lens elements, axis 15 can, as shown in FIGS. 23 and 24, be regarded as an optical or imaging axis of lens assembly 500.

Figure 25:
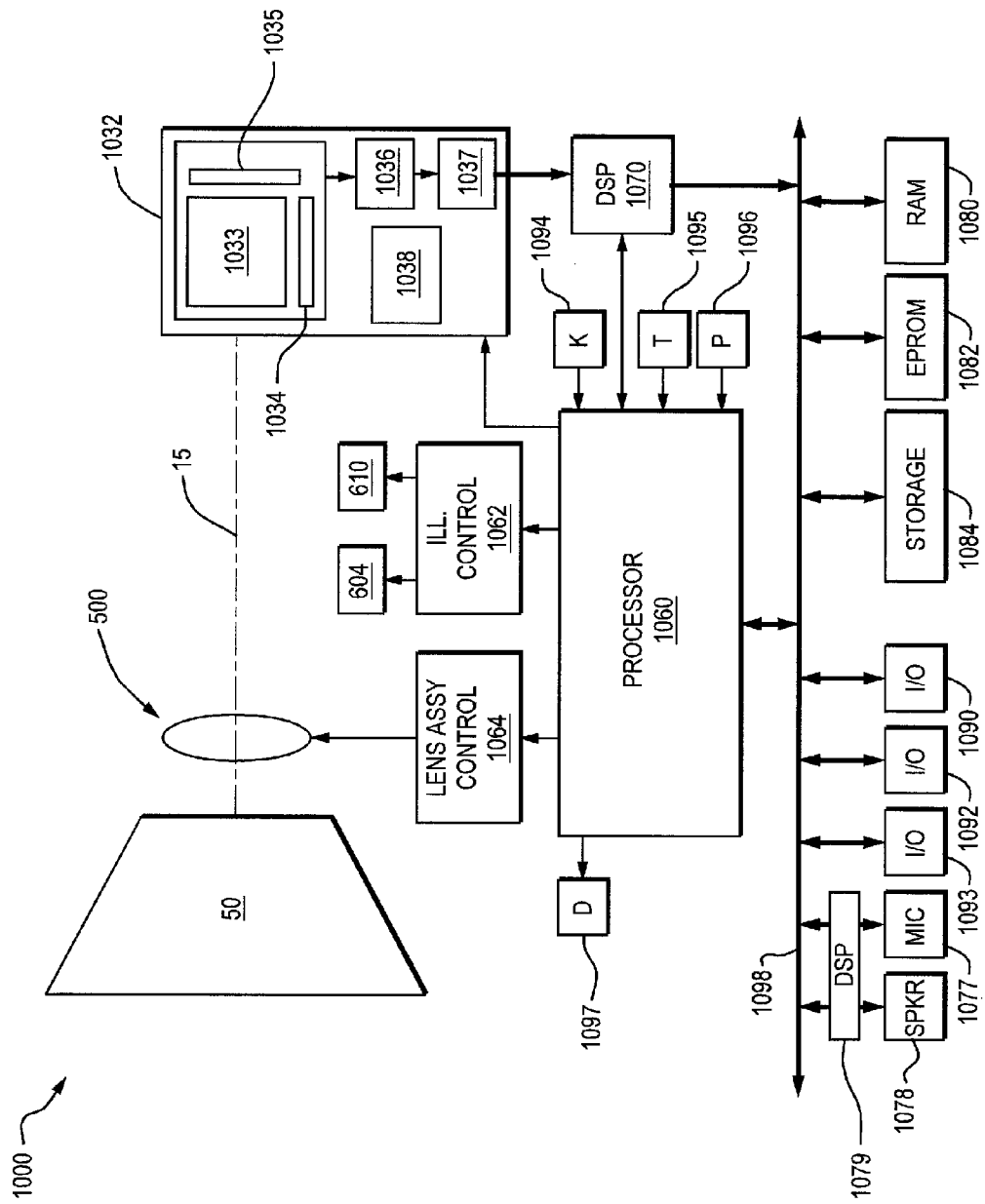
FIG. 25 is an electrical block diagram of an exemplary imaging terminal in which a deformable lens element can be incorporated.

Turning now to FIG. 25, a block diagram of an illustrative imaging terminal 1000 incorporating a lens assembly 500 as described herein is shown and described. Lens assembly 500 can be incorporated in an imaging terminal 1000.

An electrical component circuit diagram supporting operations of imaging terminal 1000 is shown in FIG. 25. Image sensor 1032 can be provided on an integrated circuit having an image sensor pixel array 1033 (image sensor array), column circuitry 1034, row circuitry 1035, a gain block 1036, an analog-to-digital converter (ADC) 1037, and a timing and control block 1038. Image sensor array 1033 can be a two dimensional image sensor array having a plurality of light sensitive pixels formed in a plurality of rows and columns. Each sensor element of the image sensor array 1033 can convert light into a voltage signal proportional to the brightness. The analog voltage signal can then be transmitted to the ADC 1037 which can translate the fluctuations of the voltage signal into a digital form. The digital output of the ADC 1037 can be transmitted to a digital signal processor (DSP) 1070 which can convert the image into an uncompressed RGB image file and/or a standard or proprietary image format before sending it to memory. Terminal 1000 can further include a processor 1060, an illumination control circuit 1062, a lens assembly control circuit 1064, an imaging lens assembly 500, a direct memory access (DMA) unit (not shown), a volatile system memory 1080 (e.g., a RAM), a nonvolatile system memory 1082 (e.g., EPROM), a storage memory 1084, a wireline input/output interface 1090 (e.g., Ethernet), short range RF transceiver interface 1092 (e.g., IEEE 802.11), and a long range radio transceiver interface 1093 (e.g., GPRS, CDMA) for use in e.g., providing cellular telephone data communications. Regarding illumination control circuit 1062, illumination control circuit 1062 can receive illumination control signals from processor 1060 and can responsively deliver power to one or more illumination light sources such as illumination light sources 604, and one or more aiming light sources such as aiming light sources 610. Terminal 1000 can be adapted so that light from light sources 604, 610 is projected onto a substrate within a field of view of terminal 1000. Terminal 1000 can also include a keyboard 1094, a trigger button 1095, and a pointer controller 1096 for input of data and for initiation of various controls and a display 1097 for output of information to an operator. Terminal 1000 can also include a system bus 1098 for providing communication between processor 1060 and various components of terminal 1000.

In one embodiment, imaging terminal 1000 can have software and hardware enabling terminal 1000 to operate as a mobile telephone. For example, the terminal 1000 can include a microphone 1077 and speaker 1078 in communication with processor 1060 over system bus 1098. Terminal 1000 can also have connected to system bus 1098 long range radio transceiver interface 1093 enabling transmittal and receipt of voice packets over a cellular data communication network.

DSP 1079 can encode an analog audio signal received from microphone 1077 to a digital audio signal to be transmitted to processor 1060. DSP 1079 can also decode an analog audio signal to be transmitted to speaker 1078 from a digital audio signal received from processor 1060. In one embodiment, all the essential functions of the audio signal encoding and decoding can be carried on by DSP 1079. In another embodiment, at least some of the audio encoding/decoding functions can be performed by a software program running on processor 1060.

Imaging terminal 1000 can also be adapted to operate as a video camera. For operation as a video camera, DSP 1070 can be adapted to convert the sequence of video frames captured by the image sensor 1032, into a video stream of a standard or proprietary video stream format (e.g., MJPEG, MPEG-4, or RealVideo™) before transmitting it to volatile memory 1080 or storage memory 1084. The recorded video files can be played back via the display 1097 or transmitted to an external computer.

Operational characteristics of an exemplary imaging terminal and its processing of image signals are now further described. In response to control signals received from processor 1060, timing and control circuit 1038 can send image sensor array timing signals to array 1033 such as reset, exposure control, and readout timing signals. After an exposure period, a frame of image data can be read out. Analog image signals that are read out of array 1033 can be amplified by gain block 1036 converted into digital form by analog-to-digital converter 1037 and sent to a digital signal processor (DSP) which can convert the image into an uncompressed RGB image format or a standard or proprietary image format (e.g., JPEG), before sending it to volatile memory 1080. In another embodiment, the raw image can be sent to the memory 1080 by ADC 1037, and the converting of the image into a standard or proprietary image format can be performed by processor 1060. Processor 1060 can address frames of image data retained in RAM 1080 for decoding of decodable indicia represented therein.

Figure 26:
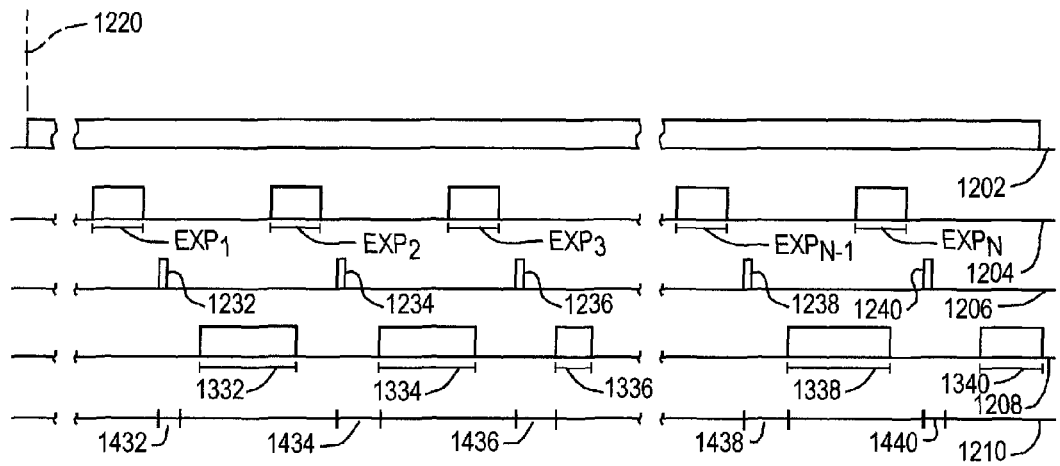
FIG. 26 is a timing diagram for illustrating exemplary aspects of operation of an imaging terminal in one embodiment.

A timing diagram further illustrating operation of terminal 1000, in one embodiment, is shown in FIG. 26. Timeline 1202 shows a state of a trigger signal which may be made active by depression of trigger button 1095. Terminal 1000 can also be adapted so that a trigger signal can be made active by the terminal sensing that an object has been moved into a field of view thereof or by receipt of a serial command from an external computer. Terminal 1000 can also be adapted so that a trigger signal is made active by a power up of terminal 1000. For example, in one embodiment, terminal 1000 can be supported on a scan stand and used for presentation reading. In such an embodiment, terminal 1000 can be adapted so that a trigger signal represented by timeline 1202 can be active for the entire time terminal 1000 is powered up. Terminal 1000 can be adapted so that trigger signal 1202 can be maintained in an active reading state (indicated by the signal 1202 remaining high) by maintaining trigger button 1095 in a depressed position. In one embodiment, where terminal 1000 is adapted to read decodable indicia, terminal 1000 can be adapted so that depressing trigger 1095 drives trigger signal 1202 into an active state where it remains until the earlier of (a) the trigger button 1095 is released, or (b) a decodable indicia is successfully decoded.

With further reference to the timing diagram of FIG. 26, terminal 1000 can be adapted so that after a trigger signal is made active at time 1220, pixels of image sensor 1032 are exposed during first exposure period $EXP_1$ occurring during a first time period followed by second exposure period $EXP_2$ occurring during a second time period, third exposure period $EXP_3$ occurring during a third time period and so on (after time 1220 and prior to first exposure period $EXP_1$, parameter determination frames subject to parameter determination processing may be optionally captured subsequent to parameter determination exposure periods that are not indicated in FIG. 26). Referring to the timing diagram of FIG. 26, terminal 1000 may expose, capture, and subject to unsuccessful decode attempts N-1 frames of image data prior to successfully decoding a frame of image data corresponding to exposure period $EXP_N$. An exposure control signal in one embodiment is represented by timeline 1204 of FIG. 26.

Terminal 1000 can be adapted so that after pixels of image sensor array 1033 are exposed during an exposure period, a readout control pulse is applied to array 1033 to read out analog voltages from image sensor 1032 representative of light incident on each pixel of a set of pixels of array 1033 during the preceding exposure period. Timeline 1206 illustrates a timing of readout control pulses applied to image sensor array 1033. A readout control pulse can be applied to image sensor array 1033 after each exposure period $EXP_1$, $EXP_2$, $EXP_3$, $EXP_{N-1}$, $EXP_N$. Readout control pulse 1232 can be applied for reading out a frame of image data exposed during first exposure period $EXP_1$. Readout control pulse 1234 can be applied for reading out a frame of image data exposed during second exposure period $EXP_2$, and readout pulse 1236 can be applied for reading out a frame of image data exposed during third exposure period, $EXP_3$. A readout control pulse 1238 can be applied for reading out a frame of image data exposed during exposure period $EXP_{N-1}$ and readout control pulse 1240 can be applied for reading out a frame of image data exposed during exposure period $EXP_N$.

After analog voltages corresponding to pixels of image sensor array 1033 are read out and digitized by analog-to-digital converter 1037, digitized pixel values corresponding to the voltages can be received by DSP 1070 and converted into a standard or proprietary image format (e.g., JPEG). In another embodiment, digitized pixel values captured by image sensor array 1033 can be received into system volatile memory 1080. Terminal 1000 can be adapted so that terminal 1000 can formatize frames of image data. For example, terminal 1000 can be adapted so that processor 1060 formats a selected frame of image data in a compressed image file format, e.g., JPEG. In another embodiment, terminal 1000 can also be adapted so that terminal 1000 formats frames of image data into a video stream format (e.g., MJPEG, MPEG-4, or RealVideo™) for transmitting to an external computer or for recording of digital movies.

Terminal 1000 can also be adapted so that processor 1060 can subject to a decode attempt a frame of image data retained in memory 1080. For example, in attempting to decode a 1D bar code symbol represented in a frame of image data, processor 1060 can execute the following processes. First, processor 1060 can launch a scan line in a frame of image data, e.g., at a center of a frame, or a coordinate location determined to include a decodable indicia representation. Next, processor 1060 can perform a second derivative edge detection to detect edges. After completing edge detection, processor 1060 can determine data indicating widths between edges. Processor 1060 can then search for start/stop character element sequences, and if found, derive element sequence characters character by character by comparing with a character set table. For certain symbologies, processor 1060 can also perform a checksum computation. If processor 1060 successfully determines all characters between a start/stop character sequence and successfully calculates a checksum (if applicable), processor 1060 can output a decoded message. When outputting a decoded message, processor 1060 can one or more of (a) initiate transfer of the decoded message to an external device, (b) initiate display of a decoded message on a display 1097 of terminal 1000, (c) attach a flag to a buffered decoded message determined by processor 1060, and (d) write the decoded message to an address on long term memory, e.g., 1082 and/or 1084. At the time of outputting a decoded message, processor 1060 can send a signal to an acoustic output device 1078 of terminal 1000 to emit a beep.

Times at which terminal 1000, in one embodiment, attempts to decode a decodable indicia represented in a frame of image data are illustrated by periods 1332, 1334, 1336, 1338, and 1340 of timeline 1208 as shown in the timing diagram of FIG. 26. Regarding timeline 1208, period 1332 illustrates a period at which terminal 1000 attempts to decode a first frame of image data having associated exposure period $EXP_1$, period 1334 illustrates a period at which terminal 1000 attempts to decode a second frame of image data having second exposure period $EXP_2$, period 1336 illustrates a period at which terminal 1000 attempts to decode a third frame of image data having third exposure period $EXP_3$, period 1338 illustrates a period at which terminal 1000 attempts to decode a frame of image data having an exposure period $EXP_{N-1}$, while period 1340 illustrates a period at which terminal 1000 attempts to decode an Nth frame of image data having exposure period $EXP_N$. It is seen the "decode time" during which terminal 1000 attempts to decode a frame of image data can vary from frame to frame.

Terminal 1000 can be adapted so that lens assembly 500 has a plurality of lens settings. It has been described that the various lens settings of lens assembly 500 can be realized by applying a force to one or more deformable lens elements. In one particular example, terminal 1000 can have 7 lens settings. At each lens setting, lens assembly 500 and therefore terminal 1000 can have a different plane of optical focus (best focus distance) and a different field of view, typically expressed by the parameter "half FOV" angle. The terminal best focus distances at each of the seven lens settings in one particular example can be given as follows: L1=2", L2=5", L3=9", L4=14", L5=20", L6=27", L7=35", where "L1-L7" are lens settings "1" through "7." Each different lens setting can have a different associated focal length half FOV angle, and plane of nominal focus. In one aspect, terminal 1000 can be adapted to "cycle" between various lens settings according to a predetermined pattern, while a trigger signal remains active. In another aspect, terminal 1000 can be adapted while a trigger signal remains active, to change settings between various lens settings that are determined according to an adaptive pattern. For example, terminal 1000 can, while trigger signal remains active, change a lens setting of assembly 500 according to a pattern which will enable terminal 1000 to establish an in-focus lens setting without simply testing the degree of focus of each of a succession of lens settings.

In another aspect, the timing of the movement of deformable lens element 10 can be coordinated with exposure periods $EXP_1$, $EXP_2$ ... $EXP_N$, so that the lens element 10 is not moved except for times intermediate of the exposure periods. Referring to timeline 1210, terminal 1000 can be adapted so that electrical signals are applied to actuator 20 to cause movement of actuator 20 and deformable lens element 10 in such manner deformable lens element 10 is in a moving state only during periods 1432, 1434, 1436, 1438 1440, which are periods intermediate of the exposure periods $EXP_1$, $EXP_2$ ... $EXP_N$. When deformable lens element 10 is controlled according to the timing diagram of FIG. 26, it is seen that deformable lens element 10 will be in a static, non-moving state during each exposure period $EXP_1$, $EXP_2$ ... $EXP_N$.

An exemplary auto-focusing algorithm is described with reference to the flow diagram of FIG. 27. At block 1502 terminal 1000 can determine whether a first frame, i.e., the frame having the exposure period $EXP_1$ is in-focus. A determination of whether a frame is in-focus can include an examination of the "flatness" of a frame of image data. Plotting pixel values of a frame in a histogram, an out-of focus frame will have a relatively "flat" distribution of pixel value intensities with a relatively even distribution of intensities over a range of intensities. An in-focus frame, on the other hand can be expected to have, relative to an out-of-focus frame, substantial incidences of pixel values at certain intensities and substantially fewer incidences at other intensities. If terminal 1000 at block 1502 determines that present frame is in-focus terminal 1000 can proceed to block 1512 to maintain the lens setting at the setting determined to be in-focus and can subject the frame to processing. The processing can include, e.g., subjecting the frame to an indicia decode attempt or outputting the frame to a display, possibly as a formatted single frame or as an outputted frame of a formatted streaming video image.

If the frame examined at block 1502 is not in-focus, terminal 1000 at block 1506 can examine a frame having a different focus setting than the frame of image data examined at block 1502. By a frame having a "certain lens setting" it is meant that the focus setting of lens assembly 500 was set to the certain setting during the exposure period associated to the frame. If terminal 1000 at block 1504 determines that the frame examined at block 1504 is in-focus, terminal 1000 can proceed to block 1512 to maintain the lens assembly 500 at the current setting (the setting yielding to the frame determined to be in-focus) and process a frame or frames exposed with the lens assembly 500 at the determined in-focus setting.

Figure 27:
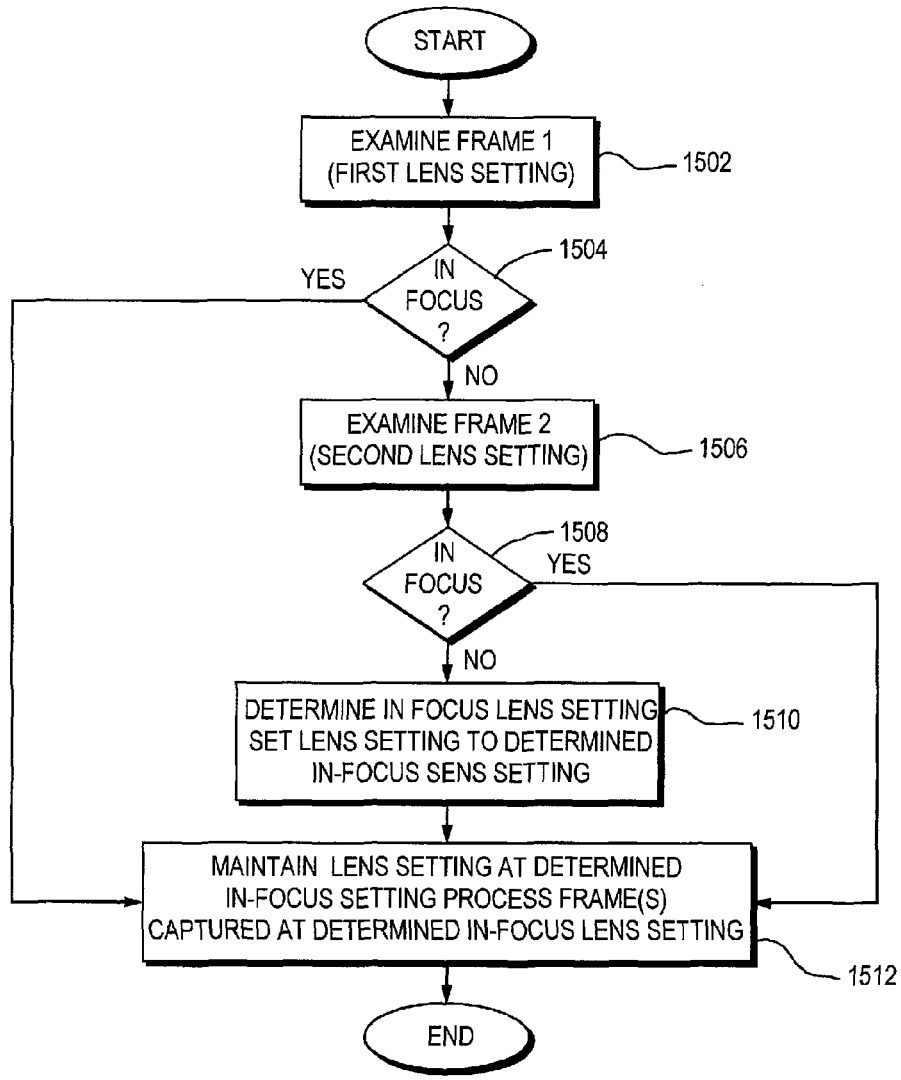
FIG. 27 is a flow diagram illustrating an auto-focus algorithm that can be executed by an imaging terminal in one embodiment.

Further referring to the timing diagram of FIG. 27, if the frame examined at block 1506 is determined at block 1508 to be not in-focus terminal 1000 can proceed to block 1510 to determine an in-focus setting based on a processing of the first frame examined at block 1502 and the second frame examined at block 1504. Such processing can include evaluating the impact on the flatness of a frame by changing a lens setting (e.g., an algorithm may run so that if captured frame becomes more flat [less in-focus] by moving the lens setting from a first setting to a second setting having a farther best focus distance than the first setting, the lens setting is set to a certain setting having a shorter best focus distance than the first setting responsively to the processing). When an in-focus setting has been determined, terminal 1000 sets the lens assembly 500 to the determined in-focus setting and can advance to block 1512 to process a frame(s) having exposure periods coinciding with times at which the lens setting is set to the determined in-focus setting. If the frame examined at block 1506 is determined at block 1508 to be in-focus, terminal 1000 can proceed to block 1512 to maintain the lens assembly 500 at the current setting and process a frame or frames exposed with the lens assembly 500 at the determined in-focus setting.

Figure 28:
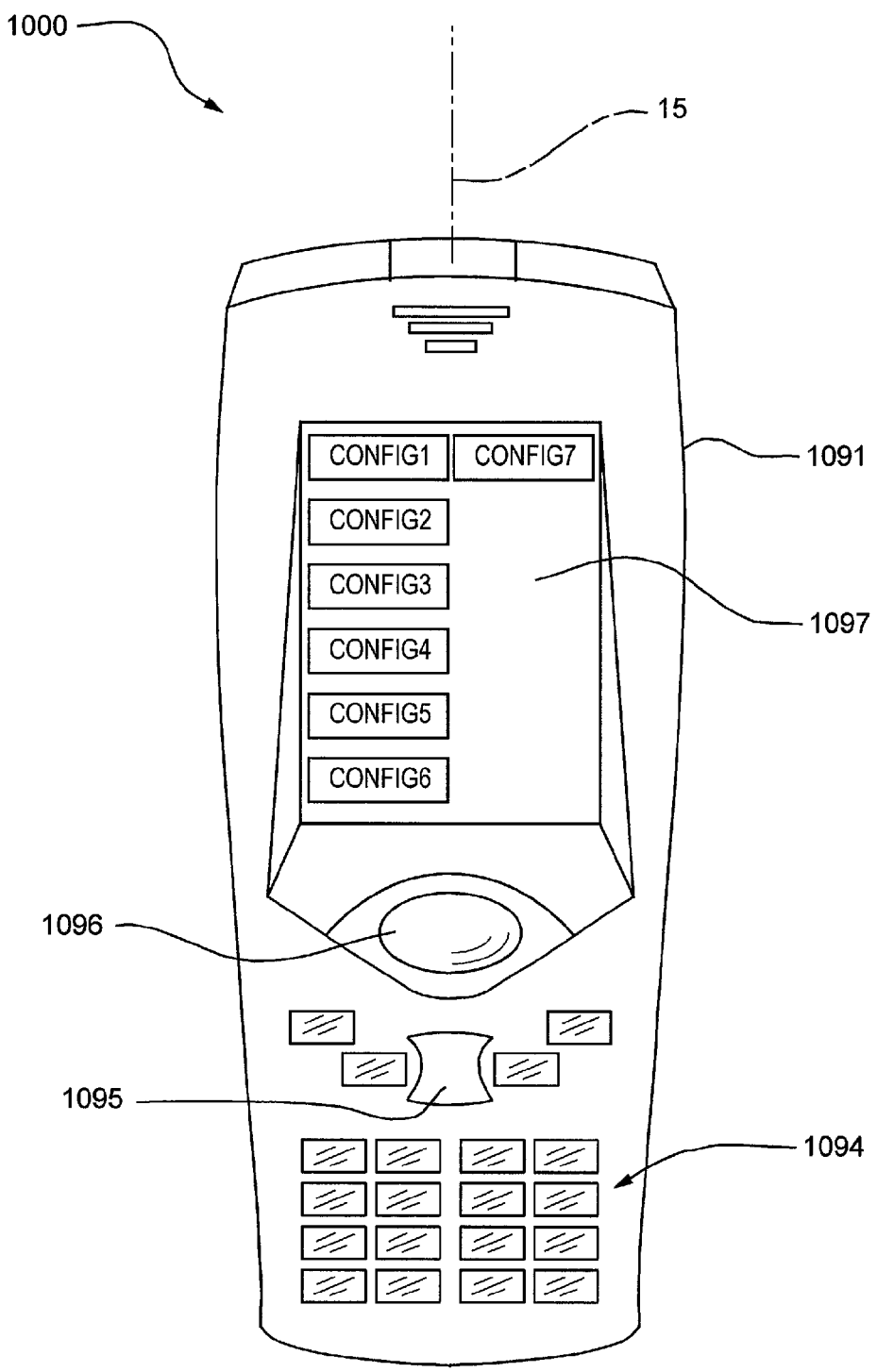

Turing now to the view of FIG. 28, a mobile hand held housing 1091 for incorporating and supporting the components of FIG. 25 is shown and described. The generic form factor of FIG. 28 represents the common form factor of a mobile e.g., cellular telephone or a portable data collection terminal for use in data collection applications. Terminal 1000 can also incorporate a housing in other familiar form factors e.g., a digital camera or a camcorder form factor.

As indicated by the displayed menu of display 1097 as shown in FIG. 28, terminal 1000 can have a plurality of operator-selectable configurations. Each configuration can have a different associated lens setting control algorithm. That is, the method by which terminal 1000 controls a lens setting of lens assembly 500 responsively to a trigger signal being made active changes depending on which configuration is selected.

Various operator selectable configurations are summarized in Table D below. In configuration 1, terminal 1000 cycles between various lens settings according to a predetermined pattern. Specifically in configuration 1, terminal 1000 changes a lens setting to a next lens setting after each exposure period, and then decrements the lens setting by 1 after a frame has been captured using the maximum far focus setting (L7). In configuration 2, terminal 1000 responsively to a trigger signal 1202 being made active changes lens settings of terminal 1000 according to an adaptive pattern. In Table D, the row entries of configuration 2 illustrate a lens setting change pattern that might be exhibited by terminal 1000 when executing an auto-focus algorithm. For frame 1 and frame 2 (having associated exposure periods 1 and 2), the lens setting is advanced. However, after frames 1 and 2 are processed a subsequent frame e.g., frame 4 corresponding to $EXP_4$ might have a lens setting of L2 if the processing of frames 1 and 2 indicates that setting L2 is an in-focus setting. In configuration 3, terminal 1000 does not change the lens setting but rather maintains the lens setting of terminal 1000 at a fixed short focus position. Configuration 3 might be selected e.g., where it is known that terminal 1000 will be used for fixed position close view indicia decoding. In configuration 4, terminal 1000 does not change the lens setting responsively to a trigger signal being maintained in an active state; but rather maintains the lens setting at far focus position. Configuration 4 might be useful e.g., where terminal 1000 will be used to capture frames for image data corresponding to far field objects. In configuration 5, terminal 1000 changes a lens setting adaptively until an in-focus lens setting is determined and then captures a predetermined number of frames using the in-focus setting. Configuration 5 might be useful e.g., where terminal 1000 is used to capture still image frames of image data. From the row data corresponding to configuration 5 in Table D it is seen that terminal 1000 might process frames 1 and 2 to determine an in-focus setting, move the lens setting to the determined in focus setting, capture a plurality of frames at the in-focus setting, process the frames, and then deactivate the trigger signal. The plurality of frames captured at the determined in-focus setting might be averaged or otherwise processed for noise reduction. Regarding configuration 6, configuration 6 is similar to configuration 1, except that terminal 1000 when operating according to configuration 6 skips lens assembly settings and maintains the lens setting at each successive setting for a plurality of frames before advancing to a next setting. Regarding configuration 7, configuration 7 illustrates operation of terminal 1000 when executing a simplified auto-focus algorithm in which terminal 1000 simply sequentially advances the lens setting for each new frame, tests the degree of focus of each incoming frame, and maintains the frame at the first frame determined to be in-focus. Note with respect to the exposure period $EXP_4$, terminal 1000 might advance the lens setting to an un-focused setting while it processes the frame having the exposure period $EXP_3$.

TABLE D

| Configuration | Exposure Period and Lens Setting Coordination | | | | | | | | | | | | |
|---|---|---|---|---|---|---|---|---|---|---|---|---|---|
| 1 Exposure Period | 1 | 2 | 3 | 4 | 5 | 6 | 7 | 8 | 9 | 10 | 11 | 12 | ... |
| Lens Setting | L1 | L2 | L3 | L4 | L5 | L6 | L7 | L6 | L5 | L4 | L3 | L2 | ... |
| 2 Exposure Period | 1 | 2 | 3 | 4 | 5 | 6 | 7 | 8 | 9 | 10 | 11 | 12 | ... |
| Lens Setting | L4 | L5 | L6 | L7 | L2 | L2 | L2 | L2 | L2 | L2 | L2 | L2 | ... |
| 3 Exposure Period | 1 | 2 | 3 | 4 | 5 | 6 | 7 | 8 | 9 | 10 | 11 | 12 | ... |
| Lens Setting | L1 | L1 | L1 | L1 | L1 | L1 | L1 | L1 | L1 | L1 | L1 | L1 | ... |
| 4 Exposure Period | 1 | 2 | 3 | 4 | 5 | 6 | 7 | 8 | 9 | 10 | 11 | 12 | ... |
| Lens Setting | L7 | L7 | L7 | L7 | L7 | L7 | L7 | L7 | L7 | L7 | L7 | L7 | ... |
| 5 Exposure Period | 1 | 2 | 3 | 4 | 5 | 6 | 7 | 8 | 9 | 10 | 11 | 12 | ... |
| Lens Setting | L4 | L5 | L6 | L7 | L3 | L3 | L3 | | | | | | ... |
| 6 Exposure Period | 1 | 2 | 3 | 4 | 5 | 6 | 7 | 8 | 9 | 10 | 11 | 12 | ... |
| Lens Setting | L1 | L1 | L1 | L3 | L3 | L3 | L5 | L5 | L5 | L7 | L7 | L7 | ... |
| 7 Exposure Period | 1 | 2 | 3 | 4 | 5 | 6 | 7 | 8 | 9 | 10 | 11 | 12 | ... |
| Lens Setting | L1 | L2 | L3 | L4 | L3 | L3 | L3 | L3 | L3 | L3 | L3 | L3 | ... |

A small sample of systems methods and apparatus that are described herein is as follows:

A1. An apparatus for use in a lens assembly, said apparatus comprising:
a deformable lens element having an axis and a deformable surface, at least part of which transmits image forming light rays; and
a force imparting structural member disposed to impart a force to said deformable surface;
wherein said apparatus is adapted so that said force imparting structural member is capable of imparting at least one of a pushing force or a pulling force to said deformable surface.

A2. The apparatus of claim A1, wherein said force imparting structural member is adapted to impart a force to said deformable surface at a plurality of force impartation points formed in a ring pattern spaced apart from and peripherally disposed about said axis.

A3. The apparatus of claim A1, wherein said force imparting structural member is adapted to impart a force to said deformable surface at a plurality of force impartation points formed in an area pattern about said axis.

A4. The apparatus of claim A1, wherein said force imparting structural member is an actuator.

A5. The apparatus of claim A1, wherein said force imparting structural member is a structural member that transmits force generated by an actuator.

A6. The apparatus of claim A1, wherein said force imparting structural member imparts a force generally in a direction of said axis.

A7. The apparatus of claim A1, wherein said deformable surface partially defines a cavity that holds focus fluid.

A8. The apparatus of claim A1, wherein a major body of said deformable lens element comprises a resiliently deformable material member, and wherein said deformable lens element is devoid of a focus fluid.

A9. The apparatus of claim A1, wherein said apparatus is adapted so that said structural member is capable of imparting both of said pushing force and said pulling force to said deformable surface.

A10. The apparatus of claim A1, wherein said apparatus is adapted so that said structural member is capable of imparting a pulling force to said deformable surface.

B1. An apparatus for use in a lens assembly, said apparatus comprising:
a deformable lens element having an axis and a deformable surface, at least part of which transmits image forming light rays; and
a force imparting structural member disposed to impart a force to said deformable surface;
wherein said apparatus is adapted so that said force imparting structural member is capable of imparting a pushing force to said deformable surface resulting in a thickness of said deformable lens member along a plurality of imaginary lines running in parallel with said imaging axis decreasing.

B2. The apparatus of claim B1, wherein said apparatus is adapted so that when said pushing force is imparted to said deformable surface, said deformable surface bulges outward in an area of said deformable surface about said axis.

B3. The apparatus of claim B1, wherein said apparatus is adapted so that said plurality of imaginary lines along which said thickness of said deformable lens element decreases do not include a plurality of imaginary lines running parallel with said imaging axis and intersecting said deformable surface within an area delimited by a ring shaped pattern spaced apart from and peripherally disposed about said axis.

B4. The apparatus of claim B1, wherein said plurality of imaginary lines include imaginary lines disposed about said axis.

C1. An apparatus for use in a lens assembly, said apparatus comprising:
- a deformable lens element having an axis and a deformable surface, at least part of which transmits image forming light rays; and
- a force imparting structural member disposed to impart a force to said deformable surface;
- wherein said apparatus is adapted so that said force imparting structural member is capable of imparting one or more of the following to said deformable surface:
  - (a) a pushing force resulting in the deformable surface bulging outward in an area of said deformable surface about said axis; and
  - (b) a pulling force resulting in a shape of said deformable surface changing.

C2. The apparatus of claim C1, wherein said deformable surface is capable of a concave configuration and wherein said pulling force increases a concavity of said deformable surface.

C3. The apparatus of claim C1, wherein said deformable surface is capable of a convex configuration and wherein said pushing force increases a convexity of said deformable surface.

C4. The apparatus of claim C1, wherein said apparatus is adapted so that said force imparting member is capable of imparting each of said pushing force and said pulling force on said deformable surface.

C5. The apparatus of claim C1, wherein at least one of said pushing force and said pulling force are generated by an electro-active polymer actuator.

C6. The apparatus of claim C1, wherein at least one of said pushing force and said pulling force is imparted in a direction generally in a direction of said axis.

C7. The apparatus of claim C1, wherein a major body of said deformable lens member comprises a resiliently deformable material member.

C8. The apparatus of claim C1, wherein said deformable surface partially defines a cavity filled with focus fluid.

C9. The apparatus of claim C1, wherein said pushing force results in a thickness of said deformable lens member decreasing along an imaginary line running in parallel with and being spaced apart from said axis.

C10. The apparatus of claim C1, wherein said pushing force results in a thickness of said deformable lens member decreasing along a plurality of imaginary lines running in parallel with and being spaced apart from said axis, the plurality of imaginary lines being peripherally disposed about said axis.

D1. An apparatus for use in a lens assembly, said apparatus comprising:
- a deformable lens member having an axis and a deformable surface, at least part of which transmits image forming light rays; and
- a force imparting structural member disposed to impart a force to said deformable surface;
- wherein said apparatus is adapted so that said force imparting structural member is capable of imparting a pushing force to said deformable surface resulting in a thickness of said deformable lens member along said axis decreasing.

D2. The apparatus of claim D1, wherein said force imparting member is configured to impart said pushing force to said deformable surface at a plurality of force impartation points that include an area about said axis, the force imparting member being optically clear for transmittal of image forming light rays.

D3. The apparatus of claim D1, wherein said deformable lens member is normally convex in an unstressed state thereof.

D4. The apparatus of claim D1, wherein said force imparting structural member imparts a force to said deformable surface at a plurality of points defined substantially over an entire area of said deformable surface.

D5. The apparatus of claim D1, wherein a major body of said deformable lens member is provided by a resiliently deformable material member.

D6. The apparatus of claim D1, wherein said force is generated by an electro-active polymer actuator having an optically clear area disposed about said axis.

D7. The apparatus of claim D1, wherein said force is generated by an electro-active polymer actuator comprising a flexible member substantially conforming to a shape of the deformable surface, the flexible member having an optically clear area disposed about said axis.

D8. The apparatus of claim D1, wherein said apparatus is adapted so that said pushing force is imparted in a direction generally in a direction of said axis.

E1. A method comprising:
- incorporating a deformable lens element into an optical system, said deformable lens element having a deformable surface, at least part of which transmits image forming light rays; and
- imparting a force to said deformable surface of said deformable lens element at a plurality of force impartation points of said surface to vary an optical characteristic of said optical system, wherein said imparting step includes the step of utilizing a force imparting structural member for imparting said force.

E2. The method of claim E1, wherein said imparting step includes the step of utilizing an electro-active polymer actuator.

E3. The method of claim E1, wherein said deformable lens element has an axis, and wherein said imparting step includes the step imparting said force generally in the direction of said axis.

E4. The method of claim E1, wherein said plurality of force imparting points are defined in a ring pattern on said surface peripherally disposed about and spaced apart from said axis.

E5. The method of claim E1, wherein said plurality of force imparting points define a two dimensional area about said axis.

E6. The method of claim E1, wherein said force is a push force directed toward said deformable lens element.

E7. The method of claim E1, wherein said force is a pull force directed away from said deformable lens element.

F1. A method comprising:
- incorporating a deformable lens element having an axis into an optical system, said deformable lens element having a deformable lens surface at least a part of which transmits image forming light rays; and
- imparting a pulling force to said deformable surface of said deformable lens element to vary an optical characteristic of said optical system, wherein said imparting step includes the step of imparting said pulling force generally in a direction of said axis.

F2. The method of claim F1, wherein said imparting step includes the step of utilizing an electro-active polymer actuator.

F3. The method of claim F1, wherein said imparting step includes the step of imparting said pulling force at a plurality of points spaced apart from and peripherally disposed about said axis.

F4. The method of claim F1, wherein said imparting step includes the step of utilizing a structural member.

G1. An optical imaging system comprising:
a deformable lens element having a deformable surface at least part of which transmits image forming light rays;
a force imparting structural member opposing said surface; and
wherein said imaging system is adapted so that a force can be imparted by said force imparting structural member at a plurality of force impartation points of said deformable surface of said deformable lens element for varying an optical characteristic of said imaging system.

G2. The optical imaging system of claim G1, wherein said force impartation points are defined in an area pattern about an axis of said deformable lens element.

G3. The optical imaging system of claim G1, wherein said force impartation points are defined in a ring pattern defined at positions spaced apart from and peripherally disposed about said axis.

H1. An optical imaging system comprising:
a deformable lens element comprising a deformable membrane, a cavity delimited by said deformable membrane, and fluid disposed in said cavity, said fluid having an index of refraction greater than one, said deformable lens element having an axis; and
a force imparting structural member capable of contact with said deformable lens element at positions defined circumferentially about said axis;
wherein said optical imaging system is configured so that said force imparting structural member can be moved generally in a direction of said axis either toward or away from said deformable lens element so that an optical characteristic of said imaging system varies with movement of said force imparting structural member.

H2. The optical imaging system of claim H1, wherein said force imparting structural member is provided by a ring-shaped pressure element.

H3. The optical imaging system of claim H1, wherein said force imparting structural member is provided by a plurality of tab-like elements of an electro-active polymer actuator.

H4. The optical imaging system of claim H1, wherein said force imparting structural member is provided by a flexible member of an electro-active polymer.

I1. An optical imaging system comprising:
a deformable lens element comprising a deformable membrane, a cavity delimited by said deformable membrane, and fluid disposed in said cavity, said fluid having an index of refraction greater than one, said deformable lens element having an axis, a ring-shaped pressure element in contact with said deformable lens element and arranged circumferentially about said axis; and
an electro-active polymer actuator mechanically coupled to said ring-shaped pressure element, said optical imaging system being configured so that said electro-active polymer actuator moves said ring-shaped pressure element generally in a direction of said axis so that an optical characteristic of said imaging system varies with movement of said ring-shaped pressure element.

I2. The optical imaging system of claim I1, wherein said electro-active polymer actuator includes a ring-shaped deformable element comprising a plurality of tab-like elements, said deformable element being circumferentially disposed about said axis, said plurality of tab-like elements engaging said ring shaped pressure element.

J1. An optical imaging system comprising:
a deformable lens element having an axis, wherein a major body of said deformable lens element is provided by a resiliently deformable member having a hardness measurement of less than Shore A 60; and
wherein said imaging system is configured so that a force can be applied to an external surface of said deformable lens for varying an optical characteristic of said imaging system.

J2. The optical imaging system of claim J1, wherein said optical imaging system includes an flexible member actuator for imparting said force, said actuator having a flexible member adapted to substantially conform to a shape of said deformable lens element.

K1. An optical system for use in imaging an object, said system comprising:
a deformable lens element capable of being deformed wherein said deformable lens element has a deformable surface that faces an exterior of said deformable lens element, said deformable lens element having an axis;
wherein said optical system is adapted so that said system can impart a force to said deformable surface generally in a direction of said axis toward said deformable lens element in such manner that an optical property of said deformable lens element is changed by impartation of said force.

K2. The optical system of claim K1, wherein said optical system is adapted so that said system imparts said force at a plurality of positions spaced apart from and peripherally disposed about said imaging axis.

K3. The optical system of claim K1, wherein said optical system includes an actuator including an aperture disposed about said axis for imparting said force to said deformable lens element generally in a direction of said axis.

L1. An optical system for use in imaging an object, said system comprising:
a deformable lens element having a deformable lens surface, at least part of which transmits image forming light rays and which faces an exterior of said deformable lens element, said deformable lens surface being one of normally convex or capable of exhibiting a convex curvature, said deformable lens element having an axis; and
an actuator for imparting a force to said deformable surface, the actuator having an aperture disposed about said axis, the optical system being adapted so that actuation of said actuator results in a force being imparted to said deformable surface to vary a convexity of said deformable lens element.

L2. The optical system of claim L1, wherein said optical system includes a pressure element transferring a force generated by said actuator to said deformable lens element.

L3. The optical system of claim L1 wherein said deformable lens element is configured so that, for achieving deformation thereof, said deformable lens element is contacted at a plurality of positions spaced apart from and peripherally disposed about said axis.

L4. The optical system of claim L1, wherein said optical system includes a force imparting structural member for imparting a force generated by said actuator and for imparting said force generated by said actuator to said deformable surface.

L5. The focus apparatus of claim L4, wherein said force imparting structural element is said actuator.

M1. A hand held data collection terminal comprising:
a two dimensional image sensor comprising a plurality of pixels formed in a plurality of rows and columns of pixels;
an imaging lens assembly comprising a deformable lens element for focusing an image onto said two dimensional image sensor, said imaging lens being adapted so that said deformable lens element can be deformed with use of a force imparting structural member, said imaging lens assembly being adapted so that force can be applied to an external surface of said deformable lens element to vary an optical property of said deformable lens element, said imaging lens setting having a first lens setting at which said deformable lens element is in a first state and a second lens setting at which said deformable lens element is in a second state; and a trigger for activating a trigger signal, said data collection terminal being adapted so that said trigger signal can be maintained in an active state by maintaining said trigger in a depressed position;

wherein said data collection terminal is adapted so that responsively to said trigger signal being maintained in said active state, said data collection terminal captures in succession a plurality of frames of image data, each of said plurality of frames of image data representing light incident on said image sensor at an instant in time, wherein said data collection terminal is adapted so that a lens setting of said imaging lens assembly is varied while said trigger signal is maintained in said active state in such manner that said lens assembly is at said first setting for an exposure period corresponding to at least one of said plurality of frames of image data, and said lens assembly is at said second lens setting for an exposure period corresponding to at least one of said plurality of frames of image data.

M2. The hand held data collection terminal of claim M1, wherein said data collection terminal is adapted so that said data collection terminal subjects to an indicia decode attempt more than one of said plurality of frames of image data.

N1. A focus apparatus comprising:
a deformable lens element having an axis, wherein a major body of said deformable lens element comprises a resiliently deformable member having at least one normally convex lens surface; and an actuator for deforming said deformable lens element, the actuator having a flexible member adapted to substantially conform to a shape of said convex lens surface and having one of a coated area or an aperture disposed about said axis, the focus apparatus being adapted so that by varying a voltage applied to said flexible member a convexity of said normally convex lens surface changes.

N2. The focus apparatus of claim N1, wherein said resiliently deformable member has a hardness of less then about Shore A 60.

N3. The focus apparatus of claim N1, wherein said resiliently deformable member has a hardness of less than about Shore A 20.

N4. The focus apparatus of claim N1, wherein said resiliently deformable member comprises silicon gel.

N5. The focus apparatus of claim N1, wherein said deformable lens element is a one piece element consisting of said resiliently deformable member.

N6. The focus apparatus of claim N1, wherein said flexible member is a flexible member interposed between a pair of flexible electrodes.

O1. A focus apparatus comprising:
a deformable lens element having an axis, wherein a major body of said deformable lens element comprises a resiliently deformable member having at least one convex lens surface; and an actuator for imparting a force to said deformable lens element to deform said deformable lens element and to change an optical property of said deformable lens element.

O2. The focus apparatus of claim O1, wherein said actuator has an aperture disposed about said axis, said actuator being selected from the group consisting of an ion conductive electro-active polymer actuator, a dielectric electro-active polymer actuator, and a hollow stepper motor.

O3. The focus apparatus of claim O1, wherein said deformable lens element has a deformable surface, at least part of which transmits image forming light rays, and where said focus apparatus includes a force imparting structural element imparting a force generated by said actuator to said deformable surface.

O4. The focus apparatus of claim O3, wherein said force imparting structural element is said actuator.

P1. A focus apparatus for use in an optical imaging system, said focus apparatus comprising;
a deformable lens element having a deformable light entry surface and an opposing deformable light exit surface, the deformable lens element having an axis intersecting respective centers of said deformable light entry surface and said opposing deformable light exit surface;

a first actuator for deforming said deformable light entry surface to change an optical property of said deformable lens element; and a second actuator for deforming said deformable light exit surface to change an optical property of said deformable lens element.

P2. The focus apparatus of claim P1, wherein at least one of said first and second actuators is an electro-active polymer actuator.

P3. The focus apparatus of claim P1, wherein at least one of said first and second actuators has an aperture disposed about said axis.

P4. The focus apparatus of claim P1, wherein said focus apparatus is adapted so that a force generated by at least one of said first and second actuators is transferred to said deformable lens element by a push ring.

P5. The focus apparatus of claim P1, wherein said deformable lens element consists of a one piece resiliently deformable member.

P6. The focus apparatus of claim P1, wherein said deformable lens element has a cavity and focus fluid disposed in said cavity.

P7. The focus apparatus of said claim P1, wherein said focus apparatus includes a first deformable membrane defining said light entry surface and second deformable membrane defining said second light entry surface, a window, first cavity delimited by said first deformable membrane and said window, a second cavity delimited by said second deformable membrane and said window, and focus fluid disposed in each of said first and second cavities.

P8. The focus apparatus of claim P1, wherein said focus apparatus is adapted so that a force generated by at least one of said first and second actuators is imparted to said deformable lens element at a plurality of points spaced apart from and peripherally disposed about said axis.

Q1. A deformable lens element comprising:
a first clamping element, the first clamping element including a rigid transparent member having an optical surface for allowing light rays to pass there through;

a deformable membrane;

a second clamping member clamping said deformable membrane against said first clamping element so that said deformable membrane opposes said rigid transparent optical surface;

a cavity delimited by said deformable membrane and said first clamping element; and a deformable substance having an index of refraction greater than one disposed in said cavity.

Q2. The deformable lens element of claim Q1, wherein said deformable substance is provided by a resiliently deformable member.

Q3. The deformable lens element of claim Q1, wherein said deformable substance comprises a focus fluid.

Q4. The deformable lens element of claim Q1, wherein said optical surface is a curved surface having an optical power.

Q5. The deformable lens element of claim Q1, wherein said optical surface is a planar optical surface.

Q6. The deformable lens element of claim Q1, wherein said second clamping element is ultrasonically welded to said second clamping element.

Q7. The deformable lens element of claim Q1, wherein at least one of said clamping elements has an annular tooth ring for increasing a securing force between said first and second clamping elements.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

We claim:

1. A hand held data collection terminal comprising:
a two dimensional image sensor comprising a plurality of pixels formed in a plurality of rows and columns of pixels;
an imaging lens assembly comprising a deformable lens element for focusing an image onto said two dimensional image sensor, said imaging lens being adapted so that said deformable lens element can be deformed, said imaging lens assembly having an imaging axis, a first lens setting at which said deformable lens element is in a first state and a second lens setting at which said deformable lens element is in a second state; and
a trigger for activating a trigger signal, said data collection terminal being adapted so that said trigger signal can be maintained in an active state by maintaining said trigger in a depressed position;
wherein said data collection terminal is adapted so that responsively to said trigger signal being maintained in said active state, said hand held data collection terminal captures in succession a plurality of frames of image data, each of said plurality of frames of image data representing light incident on said image sensor at an instant in time, wherein said data collection terminal is adapted so that a lens setting of said imaging lens assembly is varied while said trigger signal is maintained in said active state in such manner that said lens assembly is at said first setting for an exposure period corresponding to at least one of said plurality of frames of image data, and said lens assembly is at said second lens setting for an exposure period corresponding to at least one of said plurality of frames of image data; and
wherein said deformable lens element has a deformable surface, at least part of which transmits image forming light rays, wherein said hand held data collection terminal includes a force imparting structural member disposed to impart a force to said deformable surface, wherein said hand held data collection terminal is adapted so that said force imparting structural member is capable of imparting at least one of a pushing force or a pulling force to said deformable surface;
wherein said force imparting structural member is adapted so that a pushing force imparted by said force imparting structural member to said deformable surface of said deformable lens element results in a decrease of a thickness of said deformable lens element alone said imaging axis.

2. The hand held data collection terminal of claim 1, wherein said hand held data collection terminal is adapted so that said hand held data collection terminal subjects to an indicia decode attempt more than one of said plurality of frames of image data.

3. The hand held data collection terminal of claim 1, wherein said force imparting structural member imparts a force generally in a direction of said axis.

4. The hand held data collection terminal of claim 1, wherein said deformable surface partially defines a cavity that holds focus fluid.

5. The hand held data collection terminal of claim 1, wherein said hand held data collection terminal is adapted so that said force imparting structural member is capable of imparting each of the following to said deformable surface: (a) a pushing force resulting in a shape of said deformable surface changing; and (b) a pulling force resulting in a shape of said deformable surface changing.

6. The hand held data collection terminal of claim 1, wherein said force imparting structural member is capable of imparting a pulling force to said deformable surface, wherein said deformable surface is capable of a convex configuration and wherein said pulling force increases a convexity of said deformable surface.

7. The hand held data collection terminal of claim 1, wherein said force imparting structural member is capable of imparting a pushing force to said deformable surface, wherein said deformable surface is capable of a convex configuration and wherein said pushing force decreases a convexity of said deformable surface.

8. The hand held data collection terminal of claim 1, wherein at least one of said pushing force and said pulling force is imparted in a direction generally in a direction of said axis.

9. The hand held data collection terminal of claim 1, wherein a major body of said deformable lens member comprises a resiliently deformable material member.

10. The hand held data collection terminal of claim 5, wherein said deformable surface partially defines a cavity filled with focus fluid.

11. The hand held data collection terminal of claim 8, wherein each of said pushing force and said pulling force is imparted in a direction generally in a direction of said axis.

12. The hand held data collection terminal of claim 1, wherein said force imparting structural member is provided by an actuator.

13. The hand held data collection terminal of claim 5, wherein each of said pushing force and said pulling force are imparted in a direction generally in a direction of said axis.

14. The hand held data collection terminal of claim 1, wherein said hand held data collection terminal is adapted so that a force can be imparted by said force imparting structural member at a plurality of force impartation points of said deformable surface of said deformable lens element for varying an optical characteristic of said imaging lens assembly.

15. The hand held data collection terminal of claim 14, wherein said force impartation points are defined in an area pattern about an axis of said deformable lens element.

16. The hand held data collection terminal of claim 1, wherein a major body of said deformable lens element comprises a resiliently deformable material member, and wherein said deformable lens element is devoid of a focus fluid.

* * * * *